US012761366B2

(12) United States Patent
Nuss et al.

(10) Patent No.: US 12,761,366 B2
(45) Date of Patent: Oct. 13, 2026

(54) LIDAR SYSTEM WITH SCENE DEPENDENT FOCUS INTENSITY

(71) Applicant: Luminar Technologies, Inc., Orlando, FL (US)

(72) Inventors: Dominik Nuss, Palo Alto, CA (US); Pranav Maheshwari, Palo Alto, CA (US); Shubham C. Khilari, Palo Alto, CA (US); Flavian Pegado, Mountain View, CA (US); Benjamin Englard, Palo Alto, CA (US); Manuel Birke, Los Altos, CA (US)

(73) Assignee: Microvision, Inc., Redmond, WA (US)

( * ) Notice: Subject to any disclaimer, the term of this patent is extended or adjusted under 35 U.S.C. 154(b) by 1003 days.

(21) Appl. No.: 17/987,402

(22) Filed: Nov. 15, 2022

(65) Prior Publication Data

US 2023/0152466 A1 May 18, 2023

Related U.S. Application Data

(60) Provisional application No. 63/279,819, filed on Nov. 16, 2021.

(51) Int. Cl.

| | |
|---|---|
| ***G01S 17/931*** | (2020.01) |
| ***G01S 7/481*** | (2006.01) |
| ***G01S 7/497*** | (2006.01) |
| ***G01S 17/89*** | (2020.01) |

(52) U.S. Cl.

CPC .......... *G01S 17/931* (2020.01); *G01S 7/4817* (2013.01); *G01S 7/497* (2013.01); *G01S 17/89* (2013.01)

(58) Field of Classification Search

None

See application file for complete search history.

(56) References Cited

U.S. PATENT DOCUMENTS

2018/0113200 A1* 4/2018 Steinberg .............. G01S 7/4861
2019/0178988 A1 6/2019 Englard et al.
2023/0341526 A1* 10/2023 Pulikkaseril ......... G02B 27/126

FOREIGN PATENT DOCUMENTS

DE 10-2014223900 5/2016
DE 10-2019217627 5/2021

OTHER PUBLICATIONS

International Search Report and Written Opinion for PCT/US2022/049937 dated Jun. 19, 2023.

* cited by examiner

*Primary Examiner* — Isam A Alsomiri
*Assistant Examiner* — Sanjida Naser
(74) *Attorney, Agent, or Firm* — Kevin D. Wills

(57) ABSTRACT

An imaging system is described for generating an estimate for the virtual horizon for a moving vehicle. The estimate of the virtual horizon can correspond to lower and higher boundaries of a region within the field of regard, such that the virtual horizon is between the lower and the higher boundaries, in cases where determination of the virtual horizon may be unreliable due to traffic, weather or other road conditions that obscure the visibility in front of the vehicle the imaging system may switch to a static vertical scan density pattern having a broad central focus, which can mitigate the possibility that the system focuses on an incorrect virtual horizon and fails to capture significant objects or conditions in the roadway.

20 Claims, 22 Drawing Sheets

380

Ego lane visible up to 50 m, horizon control can be activated

Ego lane markings visible up to 60 m, horizon control can be activated

Example: Horizon control can not activate due to oversized leading vehicle occlusion – lane markings obscured Example: Horizon control can not activate due to weather restricting visibility – lane markings obscured

LIDAR SYSTEM WITH SCENE DEPENDENT FOCUS INTENSITY

CROSS REFERENCE TO RELATED APPLICATION

This application claims priority under 35 U.S.C. § 119 based on U.S. Provisional Application No. 63/279,819, filed on Nov. 16, 2021, the disclosure of which is hereby incorporated by reference herein.

TECHNICAL FIELD

This disclosure generally relates to imaging systems that operate according to certain scan patterns and, more particularly, to configuring such imaging systems so as to collect more data or higher-quality data in certain regions of interest.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Self-driving or "autonomous" vehicles generally employ imaging sensors, such as light detection and ranging (lidar) devices, to detect or "see" the surrounding environment as the vehicles move toward their destinations. Such vehicles include control systems that process the sensor data and, based on both the sensed environment and the desired destination, determine which maneuvers and operational parameters (e.g., speed, braking force, steering direction) are most appropriate on a more or less continuous basis throughout the trip. The autonomous vehicles seek not only to arrive at the desired destination, but also to maintain the safety of both the autonomous vehicle passengers and any individuals who may be in the general vicinity of the autonomous vehicles.

Achieving this goal is a formidable challenge, largely because an autonomous vehicle is surrounded by an environment that can rapidly change, with a wide variety of objects (e.g., other vehicles, pedestrians, stop signs, traffic lights, curbs, lane markings, etc.) potentially being present at a variety of locations/orientations relative to the vehicle. An imaging sensor that senses a portion of the environment in a fixed orientation to the vehicle may collect data that significantly over-represents a road region or a sky region that have limited contributions determining maneuvers and operational parameters. Moreover, objects and road conditions may obscure critical regions of interest. Adapting the operation of the imaging sensor to changing features of the visible environment is useful in ensuring that the regions of the environment most critical to safe operation of the vehicle are scanned so that the highest quality data is obtained for those regions.

DETAILED DESCRIPTION

Figure 1:
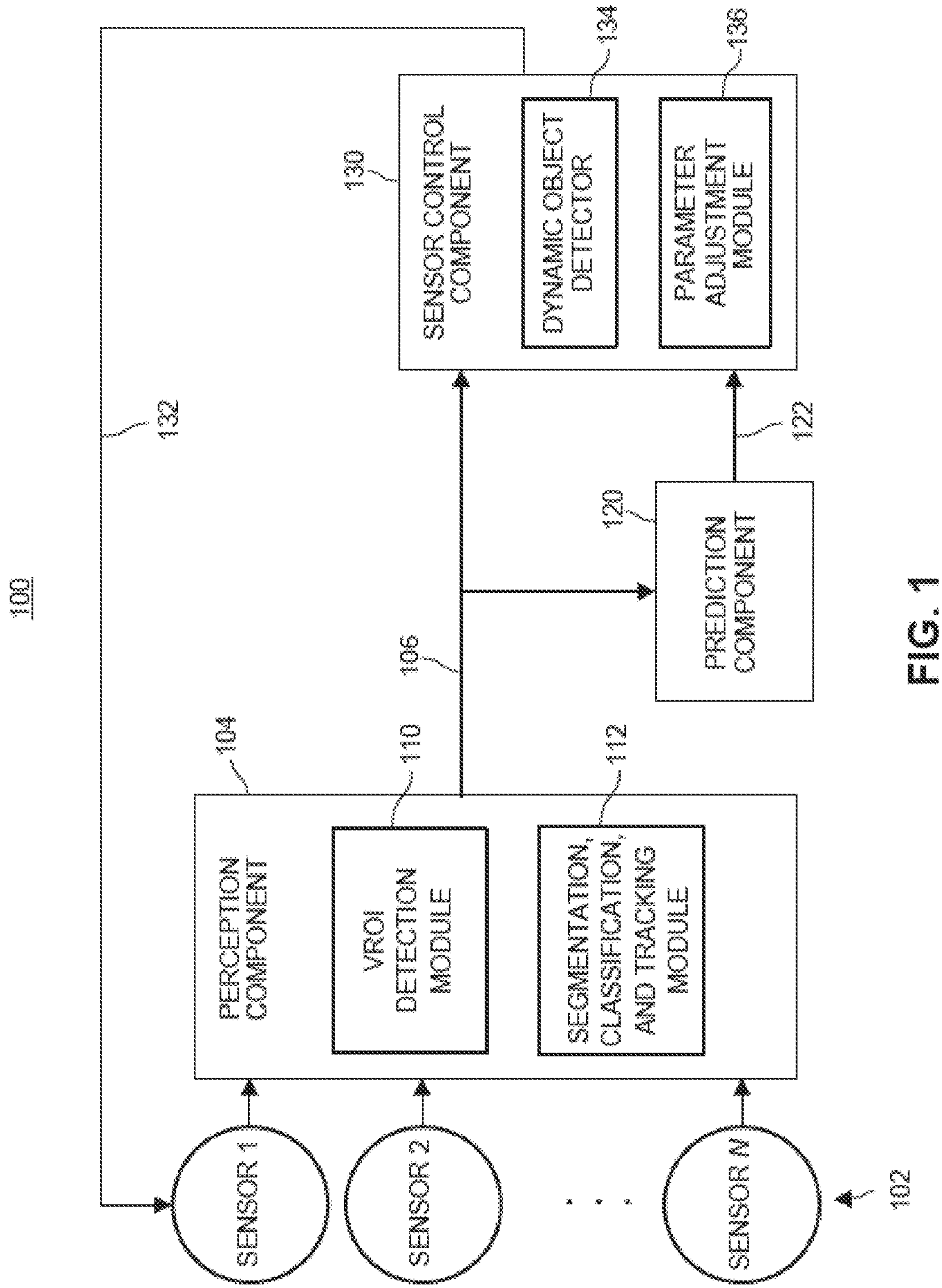
FIG. 1 is a block diagram of an example system for controlling parameters of one or more vehicle sensors based on detecting a vertical region of interest (VROI) in the vehicle's environment.

According to the techniques of this disclosure, an imaging system can generate an estimate for the virtual horizon for a moving vehicle and control parameters of vehicle sensors, and/or to process data generated by such sensors, in view of the estimate of the virtual horizon. The estimate of the virtual horizon can correspond to lower and higher boundaries of a region within the field of regard, such that the virtual horizon is between the lower and the higher boundaries. In cases where determination of the virtual horizon may be unreliable due to traffic, weather or other road conditions that obscure the visibility in front of the vehicle the imaging system may switch to a static vertical scan density pattern having a broad central focus. This can help mitigate the possibility that the system focuses on an incorrect virtual horizon and fails to capture significant objects or conditions in the roadway.

The vehicle may be a fully self-driving or "autonomous" vehicle, a vehicle controlled by a human driver, or some combination of autonomous and operator-controlled components. For example, the disclosed techniques may be used to capture vehicle environment information to improve the safety/performance of an autonomous vehicle, to generate alerts for a human driver, or simply to collect data relating to a particular driving trip (e.g., to record how many other vehicles or pedestrians were encountered during the trip, etc.). The sensors may be any type or types of sensors capable of sensing an environment through which the vehicle is moving, such as lidar, radar, cameras, and/or other types of sensors. The vehicle may also include other sensors, such as inertial measurement units (IMUs), and/or include other types of devices that provide information on the current position of the vehicle (e.g., a GPS unit).

The sensor data (and possibly other data) is processed by a perception component of the vehicle, which outputs signals indicative of the current state of the vehicle's environment. For example, the perception component may identify positions of (and in some instances classify and/or track) objects within the vehicle's environment. As a more specific example that utilizes lidar or radar data, the perception component may include a segmentation module that partitions lidar or radar point clouds into subsets of points that correspond to probable objects, a classification module that determines labels/classes for the subsets of points (segmented objects), and a tracking module that tracks segmented and/or classified objects over time (i.e., across subsequent point cloud frames).

The imaging system can adjust one or more parameters of the sensors based on various types of information and/or criteria. In some embodiments, the imaging system controls parameters that determine the area of focus of a sensor. For example, the imaging system can adjust the center and/or size of a field of regard of a lidar or radar device, and/or modify the spatial distribution of scan lines (e.g., with respect to elevation angle) produced by such a device to focus on particular types of objects, particular groupings of objects, particular types of areas in the environment (e.g., the road immediately ahead of the vehicle, the horizon ahead of the vehicle, etc.), and so on. For some implementations in which scan line distributions can be controlled, the imaging system can cause the sensor to produce scan lines arranged according to a sampling of a continuous mathematical distribution, such as a Gaussian distribution with a peak scan line density that covers the desired area of focus, or a multimodal distribution with peak scan line densities in two or more desired areas of focus. Moreover, in some implementations and/or scenarios, the imaging system can position scan lines according to an arbitrary distribution. For example, the imaging system can position scan lines to achieve a desired resolution for each of two or more areas of the environment (e.g., resulting in a 2:4:1 ratio of scan lines covering an area of road immediately ahead of the vehicle, to scan lines covering an area that includes the horizon, to scan lines covering an area above the horizon).

In some implementations, the imaging system determines the area of focus using a heuristic approach, as represented by various rules, algorithms, criteria, etc. For example, the imaging system can determine the area of focus based on the presence and positions of "dynamic" objects, or particular types of dynamic objects, within the environment. The presence, positions and/or types of the dynamic objects may be determined using data generated by the sensor that is being controlled, and/or using data generated by one or more other sensors on the vehicle. For example, a camera with a wide-angle view of the environment may be used to determine a narrower area of focus for a lidar device. As an alternative example, the imaging system can initially configure a lidar device to have a relatively large field of regard, and later be set to focus on (e.g., center a smaller field of regard upon) a dynamic object detected in a specific portion of the larger field of regard.

As another example, the imaging system can analyze the configuration of the road ahead of the vehicle for purposes of adjusting the field of regard of a sensor (e.g., lidar, camera, etc.). In particular, the elevation angle of the field of regard (e.g., the elevation angle of the center of the field of regard) may be adjusted based on the slope of one or more portions of the road. The slope of the road portion currently being traversed by the vehicle may be determined with similar sensors, and/or may be determined using one or more other devices (e.g., an IMU). The overall road configuration may be determined using a fusion of multiple sensor types, such as IMU(s), lidar(s) and/or camera(s), and/or using GPS elevation data, for example. In some embodiments, the position of the field of regard can also be adjusted in a horizontal/lateral direction based on the road configuration, e.g., if the road ahead turns to the right or left. The adjustments to the field of regard may be made with the goal of satisfying one or more predetermined visibility criteria. For example, the field of regard may be centered such that, given the slope(s) of the road ahead and the range constraints of the sensor, visibility (i.e., sensing distance) is maximized. If no center position of the field of regard can result in the sensor having some minimum threshold of visibility, the speed of the vehicle may be automatically decreased. The capability to change at least the elevation angle of the field of regard can avoid scenarios in which the sensor is overly focused on the road surface just a relatively short distance ahead of the vehicle (when driving downhill), or overly focused on the sky (when driving uphill), for example. The vertical and/or horizontal adjustments to the field of regard may occur by controlling the orientation of one or more components within the sensor (e.g., one or more mirrors within a lidar device), or in another suitable manner (e.g., by mechanically adjusting the vertical and/or horizontal orientation of the entire sensor).

Other heuristic approaches are also possible, instead of, or in addition to, the approaches described above. For example, the area of focus may be set based on the position of the horizon relative to the vehicle, the position of a nearest or furthest object from the vehicle (irrespective of whether it is a dynamic object), a level of uncertainty with respect to the classification of a particular object, and/or one or more other factors.

It can be advantageous to set the area of focus based on sensor data, but without relying on segmentation or classification of objects. In some implementations, the imaging system can combine heuristic algorithms operating directly on subsets of sensor data to determine an appropriate area of focus with suitable precision. For example, one heuristic algorithm may be used to determine, based on processing sensor data points prior to segmentation, a lower estimate of an elevation angle (with respect to the sensor) of the horizon. Another heuristic algorithm may be used to determine, based on processing sensor data points prior to segmentation, an upper estimate of an elevation angle (with respect to the sensor) of the horizon. The imaging system may set the upper and lower horizon estimates and may, correspondingly, set upper and lower bounds of a vertical region of interest (VROI). The imaging system may designate a virtual horizon within the VROI. The virtual horizon may indicate a horizon elevation line in the absence of certain obscuring elements (e.g., hills, tree lines, other vehicles) within a driving environment, or a suitable vertical look direction approximately separating horizontal surface elements of the driving environment from those substantially above the surface. The imaging system may adjust the vertical orientation of the entire sensor, the vertical field or regard, and/or the area of focus (e.g., changing the density of lidar scan lines in one or more vertical regions) in response to the determined VROI.

An example architecture of an imaging system configured to control a vehicle sensor in view of a VROI including a virtual horizon is discussed next with reference to FIG. 1, followed by a discussion of example lidar systems in which the imaging system can be implemented, with reference to FIGS. 2-5. FIGS. 6-8 then illustrate the use of the sensor control architecture in determining the VROI and adjusting the sensor parameters (e.g., lidar scan line distributions). Example methods relating to determining VROI and controlling the vehicle sensor based on the determined VROI are discussed with respect to the flow diagram of FIGS. 9, and subsequent accompanying FIGS. 10-12. FIGS. 13-17 are directed to situations where traffic or environmental conditions require that a static vertical scan pattern is used when the horizon is obscured.

FIG. 1 illustrates an example architecture of an imaging system 100 that dynamically controls one or more parameters of one or more of sensors 102. The sensors 102 may be utilized by an autonomous vehicle (e.g., to make intelligent driving decisions based on the vehicle's current environment), or by a non-autonomous vehicle for other purposes (e.g., to collect data pertaining to a particular driving trip). As the term is used herein, an "autonomous" or "self-driving" vehicle is a vehicle configured to sense its environment and navigate or drive with no human input, with little human input, with optional human input, and/or with circumstance-specific human input. For example, an autonomous vehicle may be configured to drive to any suitable location and control or perform all safety-critical functions (e.g., driving, steering, braking, parking) for the entire trip, with the driver not being expected (or even able) to control the vehicle at any time. As another example, an autonomous vehicle may allow a driver to safely turn his or her attention away from driving tasks in particular environments (e.g., on freeways) and/or in particular driving modes.

An autonomous vehicle may be configured to drive with a human driver present in the vehicle, or configured to drive with no human driver present. As an example, an autonomous vehicle may include a driver's seat with associated controls (e.g., steering wheel, accelerator pedal, and brake pedal), and the vehicle may be configured to drive with no one seated in the driver's seat or with limited, conditional, or no input from a person seated in the driver's seat. As another example, an autonomous vehicle may not include any driver's seat or associated driver's controls, with the vehicle performing substantially all driving functions (e.g., driving, steering, braking, parking, and navigating) at all times without human input (e.g., the vehicle may be configured to transport human passengers or cargo without a driver present in the vehicle). As another example, an autonomous vehicle may be configured to operate without any human passengers (e.g., the vehicle may be configured for transportation of cargo without having any human passengers onboard the vehicle).

As the term is used herein, a "vehicle" may refer to a mobile machine configured to transport people or cargo. For example, a vehicle may include, may take the form of, or may be referred to as a car, automobile, motor vehicle, truck, bus, van, trailer, off-road vehicle, farm vehicle, lawn mower, construction equipment, golf cart, motorhome, taxi, motorcycle, scooter, bicycle, skateboard, train, snowmobile, watercraft (e.g., a ship or boat), aircraft (e.g., a fixed-wing aircraft, helicopter, or dirigible), or spacecraft. In particular embodiments, a vehicle may include an internal combustion engine or an electric motor that provides propulsion for the vehicle. As shown in FIG. 1, the vehicle includes N different sensors 102, with N being any suitable integer (e.g., 1, 2, 3, 5, 10, 20, etc.). At least "Sensor 1" of the sensors 102 is configured to sense the environment of the autonomous vehicle by physically interacting with the environment in some way, such as transmitting and receiving lasers that reflect off of objects in the environment (e.g., sensor may be a lidar device), transmitting and receiving radio or acoustic signals that reflect off of objects in the environment (e.g., the sensor may be a radar or sonar device), simply receiving light waves generated or reflected from different areas of the environment (e.g., the sensor may be a camera), and so on. Depending on the embodiment, all of the sensors 102 may be configured to sense portions of the environment, or one or more of the sensors 102 may not physically interact with the external environment (e.g., if one of the sensors 102 is an inertial measurement unit (IMU)). The sensors 102 may all be of the same type, or they may include a number of different sensor types (e.g., multiple lidar devices with different viewing perspectives, and/or a combination of lidar, camera, radar, and thermal imaging devices, etc.).

The data generated by the sensors 102 is input to a perception component 104 of the sensor control architecture 100, and the data is processed by the perception component 104 to generate perception signals 106 descriptive of a current state of the vehicle's environment. It is understood that the term "current" may actually refer to a very short time prior to the generation of any given perception signals 106, e.g., due to any processing delay introduced by the at least some portions of the perception component 104 and other factors. A separate VROI detection module 110 may generate perception signals associated with horizon estimations with a shorter processing delay than the more computationally intensive modules associated with object classification, for example. To generate additional perception signals 106, the perception component 104 may include a segmentation, classification, and tracking module 112. In some implementations, separate segmentation, classification, and tracking modules generate some of the perception signals 106.

The sensor control architecture 100 also includes a prediction component 120, which processes the perception signals 106 to generate prediction signals 122 descriptive of one or more predicted future states of the vehicle's environment. For a given object, for example, the prediction component 120 may analyze the type/class of the object along with the recent tracked movement of the object (as determined by the segmentation, classification, and tracking module 112) to predict one or more future positions of the object. As a relatively simple example, the prediction component 120 may assume that any moving objects will continue to travel with no change to their current direction and speed, possibly taking into account first- or higher-order derivatives to better track objects that have continuously changing directions, objects that are accelerating, and so on. Additionally, or alternatively, the prediction component 120 may predict the perception signals associated with horizon estimations to augment and/or verify the signals generated by the VROI detection module 110 based on latest sensor data. The prediction component 120 may use past values generated by the VROI detection module 110 (e.g., using low pass, median, Kalman, or any other suitable filtering) and/or past values generated by the segmentation, classification, and tracking module 112 (e.g., using identified road configuration).

The perception signals 106 and (in some embodiments) prediction signals 122 are input to a sensor control component 130, which processes the signals 106, 122 to generate sensor control signals 132 that control one or more parameters of at least one of the sensors 102 (including at least a parameter of "Sensor 1"). In particular, the sensor control component 130 attempts to direct the focus of one or more of the sensors 102 based on the detected and/or predicted VROI. The parameter adjustment module 136 determines the setting for parameter(s) of the controlled sensor(s) (among sensors 102) at least in part based on the detected VROI. In particular, the parameter adjustment module 136 determines values of one or more parameters that set the area of focus of the controlled sensor(s). Generally, the controlled parameter(s) is/are parameters that affect which area/portion of the vehicle environment is sensed by a particular sensor. For example, the parameter adjustment module 136 may determine values that set the horizontal and/or vertical field of regard of the controlled sensor(s) (e.g., the range of azimuthal and/or elevation angles covered by the field of regard), the center of the field of regard (e.g., by mechanically moving the entire sensor, or adjusting mirrors that move the center of the field of regard), and/or the spatial distribution of scan lines produced by the sensor(s). Example scan line distributions are discussed in more detail below, with reference to FIGS. 7 and 8. In some embodiments, the controlled sensor parameter(s) affect not only the area of focus for a sensor, but also the manner in which a given area of the vehicle environment is sensed. For example, the parameter adjustment module 136 may control the frame/refresh rate of the sensor, the resolution (e.g., number of points per point cloud frame) of the sensor, and so on.

As seen from various examples provided above, sensor data collected by a vehicle may in some embodiments include point cloud data that is generated by one or more lidar devices or, more generally, a lidar system. To provide a better understanding of the types of data that may be generated by lidar systems, and of the manner in which lidar systems and devices may function, example lidar systems and point clouds will now be described with reference to FIGS. 2-5.

Figure 2:
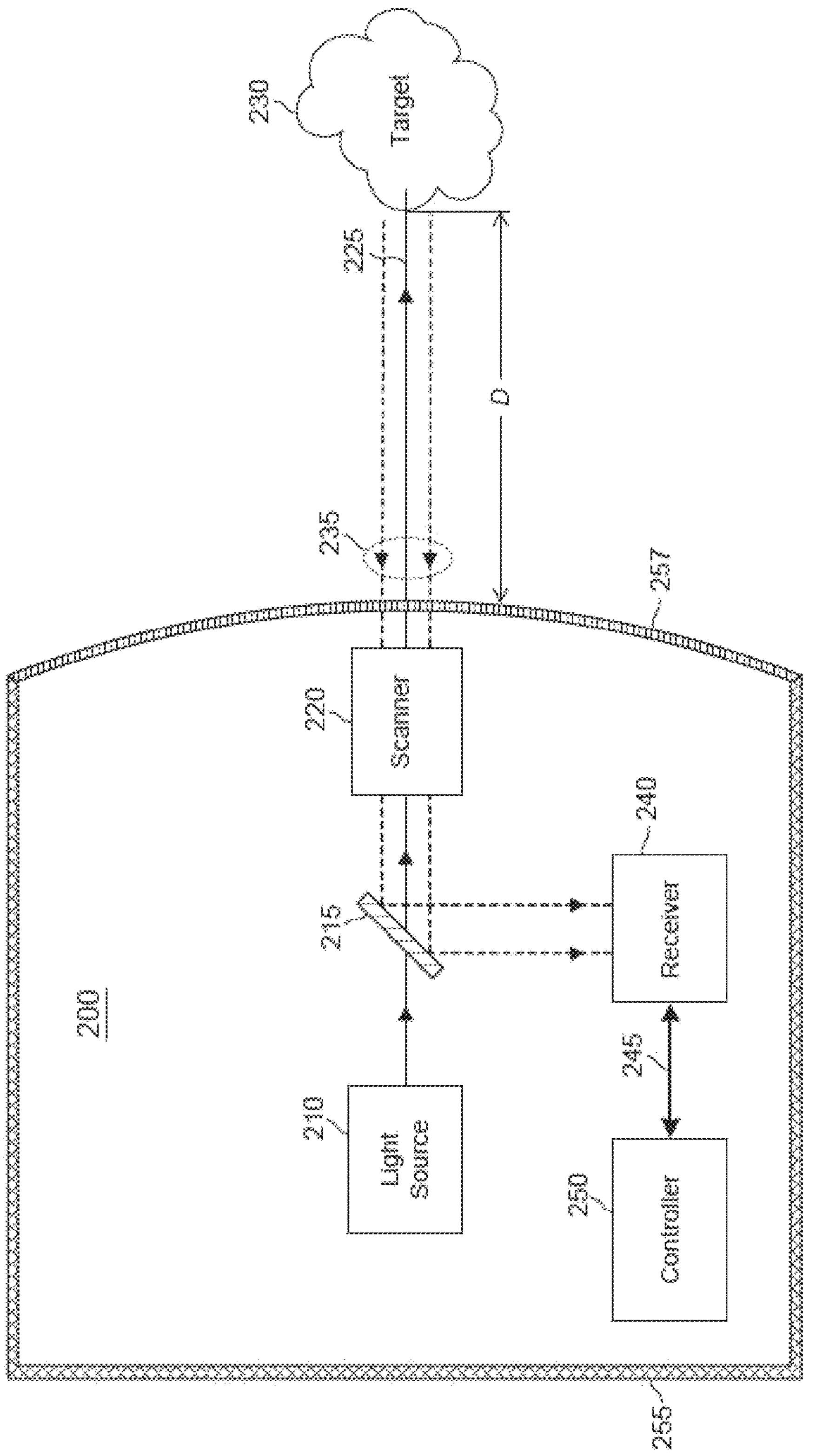
FIG. 2 is a block diagram of an example light detection and ranging (lidar) system that may be controlled using the sensor control architecture of FIG. 1.

Referring first to FIG. 2, a lidar system 200 can operate as at least one of the sensors 102 of FIG. 1, for example. While various lidar system components and characteristics are described herein, it is understood that any suitable lidar device(s) or system(s), and/or any other suitable types of sensors, may provide sensor data for processing using the software architectures described herein.

The example lidar system 200 may include a light source 210, a mirror 215, a scanner 220, a receiver 240, and a controller 250. The light source 210 may be, for example, a laser (e.g., a laser diode) that emits light having a particular operating wavelength in the infrared, visible, or ultraviolet portions of the electromagnetic spectrum. In operation, the light source 210 emits an output beam of light 225 which may be continuous-wave, pulsed, or modulated in any suitable manner for a given application. The output beam of light 225 is directed downrange toward a remote target 230 located a distance D from the lidar system 200 and at least partially contained within a field of regard of the system 200.

Once the output beam 225 reaches the downrange target 230, the target 230 may scatter or, in some cases, reflect at least a portion of light from the output beam 225, and some of the scattered or reflected light may return toward the lidar system 200. In the example of FIG. 2, the scattered or reflected light is represented by input beam 235, which passes through the scanner 220, which may be referred to as a beam scanner, optical scanner, or laser scanner. The input beam 235 passes through the scanner 220 to the mirror 215, which may be referred to as an overlap mirror, superposition mirror, or beam-combiner mirror. The mirror 215 in turn directs the input beam 235 to the receiver 240.

The input beam 235 may include light from the output beam 225 that is scattered by the target 230, light from the output beam 225 that is reflected by the target 230, or a combination of scattered and reflected light from target 230. According to some implementations, the lidar system 200 can include an "eye-safe" laser that presents little or no possibility of causing damage to the human eye. The input beam 235 may contain only a relatively small fraction of the light from the output beam 225.

The receiver 240 may receive or detect photons from the input beam 235 and generate one or more representative signals. For example, the receiver 240 may generate an output electrical signal 245 that is representative of the input beam 235. The receiver may send the electrical signal 245 to the controller 250. Depending on the implementation, the controller 250 may include one or more instruction-executing processors, an application-specific integrated circuit (ASIC), a field-programmable gate array (FPGA), and/or other suitable circuitry configured to analyze one or more characteristics of the electrical signal 245 in order to determine one or more characteristics of the target 230, such as its distance downrange from the lidar system 200. More particularly, the controller 250 may analyze the time of flight or phase modulation for the beam of light 225 transmitted by the light source 210. If the lidar system 200 measures a time of flight of T (e.g., T representing a round-trip time of flight for an emitted pulse of light to travel from the lidar system 200 to the target 230 and back to the lidar system 200), then the distance D from the target 230 to the lidar system 200 may be expressed as $D=c\cdot T/2$, where c is the speed of light (approximately $3.0\times10^8$ m/s).

The distance D from the lidar system 200 is less than or equal to a maximum range $R_{MAX}$ of the lidar system 200. The maximum range $R_{MAX}$ (which also may be referred to as a maximum distance) of a lidar system 200 may correspond to the maximum distance over which the lidar system 200 is configured to sense or identify targets that appear in a field of regard of the lidar system 200. The maximum range of lidar system 200 may be any suitable distance, such as 50 m, 200 m, 500 m, or 1 km, for example.

In some implementations, the light source 210, the scanner 220, and the receiver 240 may be packaged together within a single housing 255, which may be a box, case, or enclosure that holds or contains all or part of the lidar system 200. The housing 255 includes a window 257 through which the beams 225 and 235 pass. The controller 250 may reside within the same housing 255 as the components 210, 220, and 240, or the controller 250 may reside outside of the housing 255. In one embodiment, for example, the controller 250 may instead reside within, or partially within, the perception component 104 of the sensor control architecture 100 shown in FIG. 1. In some implementations, the housing 255 includes multiple lidar sensors, each including a respective scanner and a receiver. Depending on the particular implementation, each of the multiple sensors can include a separate light source or a common light source. The multiple sensors can be configured to cover non-overlapping adjacent fields of regard or partially overlapping fields of regard, for example, depending on the implementation.

With continued reference to FIG. 2, the output beam 225 and input beam 235 may be substantially coaxial. In other words, the output beam 225 and input beam 235 may at least partially overlap or share a common propagation axis, so that the input beam 235 and the output beam 225 travel along substantially the same optical path (albeit in opposite directions). As the lidar system 200 scans the output beam 225 across a field of regard, the input beam 235 may follow along with the output beam 225, so that the coaxial relationship between the two beams is maintained.

Generally speaking, the scanner 220 steers the output beam 225 in one or more directions downrange. To accomplish this, the scanner 220 may include one or more scanning mirrors and one or more actuators driving the mirrors to rotate, tilt, pivot, or move the mirrors in an angular manner about one or more axes, for example. While FIG. 2 depicts only a single mirror 215, the lidar system 200 may include any suitable number of flat or curved mirrors (e.g., concave, convex, or parabolic mirrors) to steer or focus the output beam 225 or the input beam 235. For example, the first mirror of the scanner may scan the output beam 225 along a first direction, and the second mirror may scan the output beam 225 along a second direction that is substantially orthogonal to the first direction.

A "field of regard" of the lidar system 200 may refer to an area, region, or angular range over which the lidar system 200 may be configured to scan or capture distance information. When the lidar system 200 scans the output beam 225 within a 30-degree scanning range, for example, the lidar system 200 may be referred to as having a 30-degree angular field of regard. The scanner 220 may be configured to scan the output beam 225 horizontally and vertically, and the field of regard of the lidar system 200 may have a particular angular width along the horizontal direction and another particular angular width along the vertical direction. For example, the lidar system 200 may have a horizontal field of regard of 10° to 120° and a vertical field of regard of 2° to 45°.

The one or more scanning mirrors of the scanner 220 may be communicatively coupled to the controller 250, which may control the scanning mirror(s) to guide the output beam 225 in a desired direction downrange or along a desired scan pattern. In general, a scan (or scan line) pattern may refer to a pattern or path along which the output beam 225 is directed. The lidar system 200 can use the scan pattern to generate a point cloud with points or "pixels" that substantially cover the field of regard. The pixels may be approximately evenly distributed across the field of regard, or they may be distributed according to a particular non-uniform distribution.

In operation, the light source 210 may emit pulses of light which the scanner 220 scans across a field of regard of the lidar system 200. The target 230 may scatter one or more of the emitted pulses, and the receiver 240 may detect at least a portion of the pulses of light scattered by the target 230. The receiver 240 may receive or detect at least a portion of the input beam 235 and produce an electrical signal that corresponds to the input beam 235. The controller 250 may be electrically coupled or otherwise communicatively coupled to one or more of the light source 210, the scanner 220, and the receiver 240. The controller 250 may provide instructions, a control signal, or a trigger signal to the light source 210 indicating when the light source 210 should produce optical pulses, and possibly characteristics (e.g., duration, period, peak power, wavelength, etc.) of the pulses. The controller 250 may also determine a time-of-flight value for an optical pulse based on timing information associated with when the pulse was emitted by light source 210 and when a portion of the pulse (e.g., the input beam 235) was detected or received by the receiver 240.

As indicated above, the lidar system 200 may be used to determine the distance to one or more downrange targets 230. By scanning the lidar system 200 across a field of regard, the system can be used to map the distance to a number of points within the field of regard. Each of these depth-mapped points may be referred to as a pixel or a voxel. A collection of pixels captured in succession (which may be referred to as a depth map, a point cloud, or a point cloud frame) may be rendered as an image or may be analyzed to identify or detect objects or to determine a shape or distance of objects within the field of regard. For example, a depth map may cover a field of regard that extends 60° horizontally and 15° vertically, and the depth map may include a frame of 100-2000 pixels in the horizontal direction by 4-400 pixels in the vertical direction.

The lidar system 200 may be configured to repeatedly capture or generate point clouds of a field of regard at any suitable frame rate between approximately 0.1 frames per second (FPS) and approximately 1,000 FPS, for example. The point cloud frame rate may be substantially fixed or dynamically adjustable, depending on the implementation. In general, the lidar system 200 can use a slower frame rate (e.g., 1 Hz) to capture one or more high-resolution point clouds, and use a faster frame rate (e.g., 10 Hz) to rapidly capture multiple lower-resolution point clouds.

The field of regard of the lidar system 200 can overlap, encompass, or enclose at least a portion of the target 230, which may include all or part of an object that is moving or stationary relative to lidar system 200. For example, the target 230 may include all or a portion of a person, vehicle, motorcycle, truck, train, bicycle, wheelchair, pedestrian, animal, road sign, traffic light, lane marking, road-surface marking, parking space, pylon, guard rail, traffic barrier, pothole, railroad crossing, obstacle in or near a road, curb, stopped vehicle on or beside a road, utility pole, house, building, trash can, mailbox, tree, any other suitable object, or any suitable combination of all or part of two or more objects.

Figure 3:
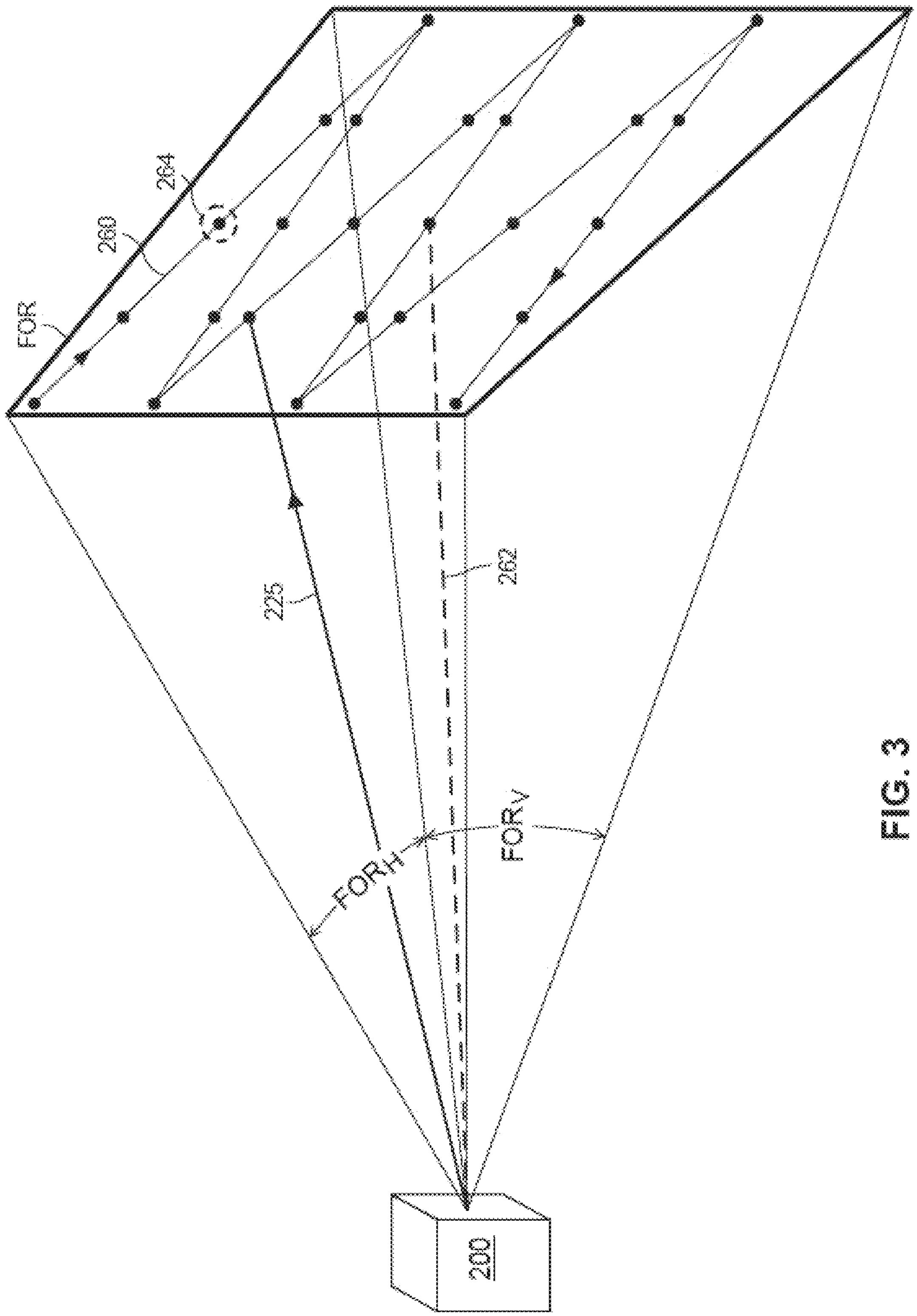
FIG. 3 illustrates an example scan pattern which the lidar system of FIG. 2 may produce when identifying targets within a field of regard.
Figure 4:
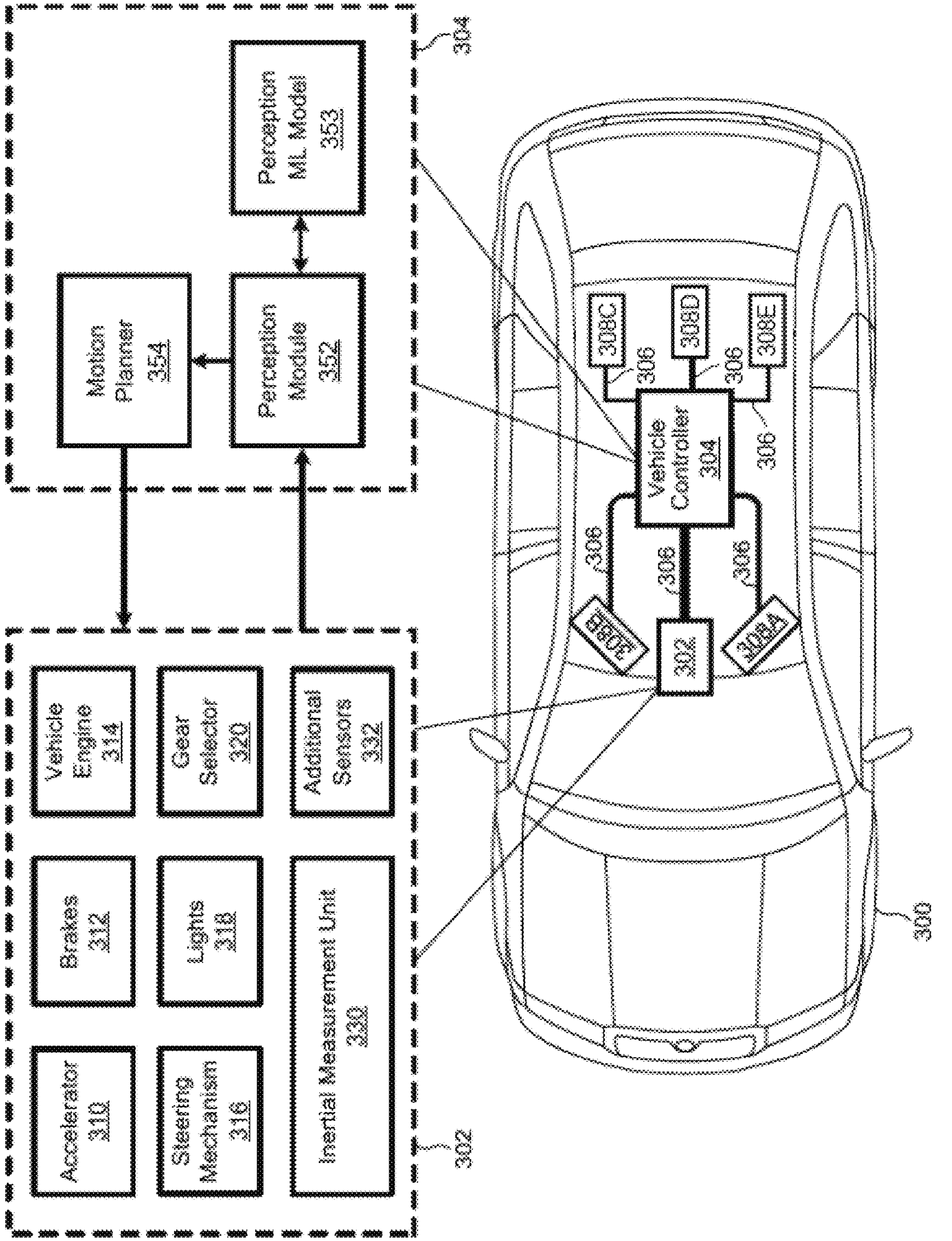
FIG. 4 illustrates an example vehicle in which the lidar system of FIG. 2 may operate.

FIG. 3 illustrates an example scan pattern 260 which the lidar system 200 of FIG. 2 may produce. In particular, the lidar system 200 may be configured to scan the output optical beam 225 along the scan pattern 260. In some implementations, the scan pattern 260 corresponds to a scan across any suitable field of regard having any suitable horizontal field of regard ($FOR_H$) and any suitable vertical field of regard ($FOR_v$). For example, a certain scan pattern may have a field of regard represented by angular dimensions (e.g., $FOR_H \times FOR_v$) 40°×30°, 90°×40° or 60°×15°. While FIG. 3 depicts a "zig-zag" pattern 260, other implementations may instead employ other patterns (e.g., parallel, horizontal scan lines), and/or other patterns may be employed in specific circumstances.

In the example implementation and/or scenario of FIG. 3, reference line 262 represents a center of the field of regard of scan pattern 260. In FIG. 3, if the scan pattern 260 has a 60°×15° field of regard, then the scan pattern 260 covers a ±30° horizontal range with respect to reference line 262 and a ±7.5° vertical range with respect to reference line 262. An azimuth (which may be referred to as an azimuth angle) may represent a horizontal angle with respect to the reference line 262, and an altitude (which may be referred to as an altitude angle, elevation, or elevation angle) may represent a vertical angle with respect to the reference line 262.

The scan pattern 260 may include multiple points or pixels 264, and each pixel 264 may be associated with one or more laser pulses and one or more corresponding distance measurements. A cycle of scan pattern 260 may include a total of $P_x \times P_y$ pixels 264 (e.g., a two-dimensional distribution of $P_x$ by $P_y$ pixels). The number of pixels 264 along a horizontal direction may be referred to as a horizontal resolution of the scan pattern 260, and the number of pixels 264 along a vertical direction may be referred to as a vertical resolution of the scan pattern 260.

Each pixel 264 may be associated with a distance/depth (e.g., a distance to a portion of a target 230 from which the corresponding laser pulse was scattered) and one or more angular values. As an example, the pixel 264 may be associated with a distance value and two angular values (e.g., an azimuth and altitude) that represent the angular location of the pixel 264 with respect to the lidar system 200. A distance to a portion of the target 230 may be determined based at least in part on a time-of-flight measurement for a corresponding pulse. More generally, each point or pixel 264 may be associated with one or more parameter values in addition to its two angular values. For example, each point or pixel 264 may be associated with a depth (distance) value, an intensity value as measured from the received light pulse, and/or one or more other parameter values, in addition to the angular values of that point or pixel.

An angular value (e.g., an azimuth or altitude) may correspond to an angle (e.g., relative to reference line 262) of the output beam 225 (e.g., when a corresponding pulse is emitted from lidar system 200) or an angle of the input beam 235 (e.g., when an input signal is received by lidar system 200). In some implementations, the lidar system 200 determines an angular value based at least in part on a position of a component of the scanner 220. For example, an azimuth or altitude value associated with the pixel 264 may be determined from an angular position of one or more corresponding scanning mirrors of the scanner 220. The zero elevation, zero azimuth direction corresponding to the reference line 262 may be referred to as a neutral look direction (or neutral direction of regard) of the lidar system 200.

In some implementations, a light source of a lidar system is located remotely from some of the other components of the lidar system such as the scanner and the receiver. Moreover, a lidar system implemented in a vehicle may include fewer light sources than scanners and receivers.

FIG. 4A illustrates an example autonomous vehicle 300 in which a controller 304 can operate various components 302 for maneuvering and otherwise control operation of the vehicle 300. These components are depicted in an expanded view in FIG. 4A for clarity. The perception component 104, the prediction component 120, and the sensor control component 130, illustrated in FIG. 1, can be implemented in the vehicle controller 304 of FIG. 4A.

The components 302 can include an accelerator 310, brakes 312, a vehicle engine 314, a steering mechanism 316, lights 318 such as brake lights, head lights, reverse lights, emergency lights, etc., a gear selector 320, and/or other suitable components that effectuate and control movement of the vehicle 300. The gear selector 320 may include the park, reverse, neutral, drive gears, etc. Each of the components 302 may include an interface via which the component receives commands from the vehicle controller 304 such as "increase speed," "decrease speed," "turn left 5 degrees," "activate left turn signal," etc. and, in some cases, provides feedback to the vehicle controller 304.

The autonomous vehicle 300 can be equipped with a lidar system including multiple sensor heads 308A-E coupled to the controller via sensor links 306. Each of the sensor heads 308 may include a light source and a receiver, for example, and each of the sensor links 306 may include one or more optical links and/or one or more electrical links. The sensor heads 308 in FIG. 4A are positioned or oriented to provide a greater than 30-degree view of an environment around the vehicle. More generally, a lidar system with multiple sensor heads may provide a horizontal field of regard around a vehicle of approximately 30°, 45°, 60°, 90°, 120°, 180°, 270°, or 360°. Each of the sensor heads 308 may be attached to, or incorporated into, a bumper, fender, grill, side panel, spoiler, roof, headlight assembly, taillight assembly, rear-view mirror assembly, hood, trunk, window, or any other suitable part of the vehicle.

In the example of FIG. 4A, five sensor heads 308 are positioned on the vehicle (e.g., each of the sensor heads 308 may be incorporated into a light assembly, side panel, bumper, or fender) at positions providing different fields of view for the sensor heads 308, and the laser may be located within the vehicle 300 (e.g., in or near the trunk). The five sensor heads 308 may each provide a 120° horizontal field of regard (FOR), and the five sensor heads 308 may be oriented so that together they provide a complete 360-degree view around the vehicle. As another example, the lidar system 302 may include six sensor heads 308 positioned on or around the vehicle 300, where each of the sensor heads 308 provides a 60° to 90° horizontal FOR. As another example, the lidar system may include eight sensor heads 308, and each of the sensor heads 308 may provide a 45° to 60° horizontal FOR. As yet another example, the lidar system may include six sensor heads 308, where each of the sensor heads 308 provides a 70° horizontal FOR with an overlap between adjacent sensor heads 308 of approximately 10°. As another example, the lidar system may include two sensor heads 308 which together provide a forward-facing horizontal FOR of greater than or equal to 30°.

Data from each of the sensor heads 308 may be combined or stitched together to generate a point cloud that covers a less than or equal to 360-degree horizontal view around a vehicle. For example, the lidar system may include a controller or processor that receives data from each of the sensor heads 308 (e.g., via a corresponding electrical link 306) and processes the received data to construct a point cloud covering a 360-degree horizontal view around a vehicle or to determine distances to one or more targets. The point cloud or information from the point cloud may be provided to a vehicle controller 304 via a corresponding electrical, optical, or radio link 306. The vehicle controller 304 may include one or more CPUs, GPUs, and a non-transitory memory with persistent components (e.g., flash memory, an optical disk) and/or non-persistent components (e.g., RAM)

In some implementations, the point cloud is generated by combining data from each of the multiple sensor heads 308 at a controller included within the lidar system, and the point cloud is provided to the vehicle controller 304. In other implementations, each of the sensor heads 308 includes a controller or processor that constructs a point cloud for a portion of the 360-degree horizontal view around the vehicle and provides the respective point cloud to the vehicle controller 304. The vehicle controller 304 then combines or stitches together the points clouds from the respective sensor heads 308 to construct a combined point cloud covering a 360-degree horizontal view. Still further, the vehicle controller 304 in some implementations communicates with a remote server to process point cloud data.

In some implementations, the vehicle controller 304 receives point cloud data from the sensor heads 308 via the links 306 and analyzes the received point cloud data, using any one or more of the aggregate or individual SDCAs disclosed herein, to sense or identify targets and their respective locations, distances, speeds, shapes, sizes, type of target (e.g., vehicle, human, tree, animal), etc. The vehicle controller 304 then provides control signals via the links 306 to the components 302 to control operation of the vehicle based on the analyzed information.

In addition to the lidar system, the vehicle 300 may also be equipped with an inertial measurement unit (IMU) 330 and other sensors 332 such a camera, a thermal imager, a conventional radar (none illustrated to avoid clutter), etc. The other sensors 332 may each have respective FORs that may be stitched together to generate 360-degree horizontal views around the vehicle. In embodiments, the data from the other sensors 332 may be combined with the data from the sensor heads 308 to generate data sets to enable autonomous operation of the vehicle 300. The sensors 330 and 332 can provide additional data to the vehicle controller 304 via wired or wireless communication links. Further, the vehicle 300 in an example implementation includes a microphone array operating as a part of an acoustic source localization system configured to determine sources of sounds.

As illustrated in FIG. 4A, the vehicle controller 304 can include a perception module 352 and a motion planner 354, each of which can be implemented using hardware, firmware, software, or any suitable combination of hardware, firmware, and software. In relation to the components in FIG. 1, the perception component 104 may be included in the perception module 352, while the prediction component 120 and the sensor control component 130 may be integrated into the motion planner 354, for example. In operation, the perception module 352 can receive sensor data from the sensors 330, 332, 308A-E, etc. and apply the received sensor data to a perception model 353 to generate parameters of the environment in which the autonomous vehicle 300 operates, such as curvature of the road, presence of obstacles, distance to obstacles, etc. The perception module 352 then can supply these generated parameters to the motion planner 354, which in turn generates decisions for controlling the autonomous vehicle 300 and provides corresponding commands to the accelerator 310, the brakes 312, the vehicle engine 314, the steering mechanism 316, etc.

The motion planner 354 may utilize any suitable type(s) of rules, algorithms, heuristic models, machine learning models, or other suitable techniques to make driving decisions based on the output of the perception module 352, which utilizes the perception model 353 as discussed above. For example, in some implementations, the motion planner 354 is configured with corresponding algorithms to make particular decisions for controlling the autonomous vehicle 300 in response to specific signals or combination of signals. As another example, in some embodiments, a machine learning model for the motion planner 354 may be trained using descriptions of environmental parameters of the type the perception model 353 generates. In additional embodiments, virtual data to train a machine learning model of motion planner 354. For example, the motion planner 354 may be a "learning based" planner (e.g., a planner that is trained using supervised learning or reinforcement learning), a "search based" planner (e.g., a continuous A* planner), a "sampling based" planner (e.g., a planner that performs random searches in a space that represents a universe of possible decisions), a "predictive control based" planner (e.g., a model predictive control (MPC) planner), and so on. In any case, a training platform can train the motion planning model separately and independently of the perception module 352.

Figure 5A:
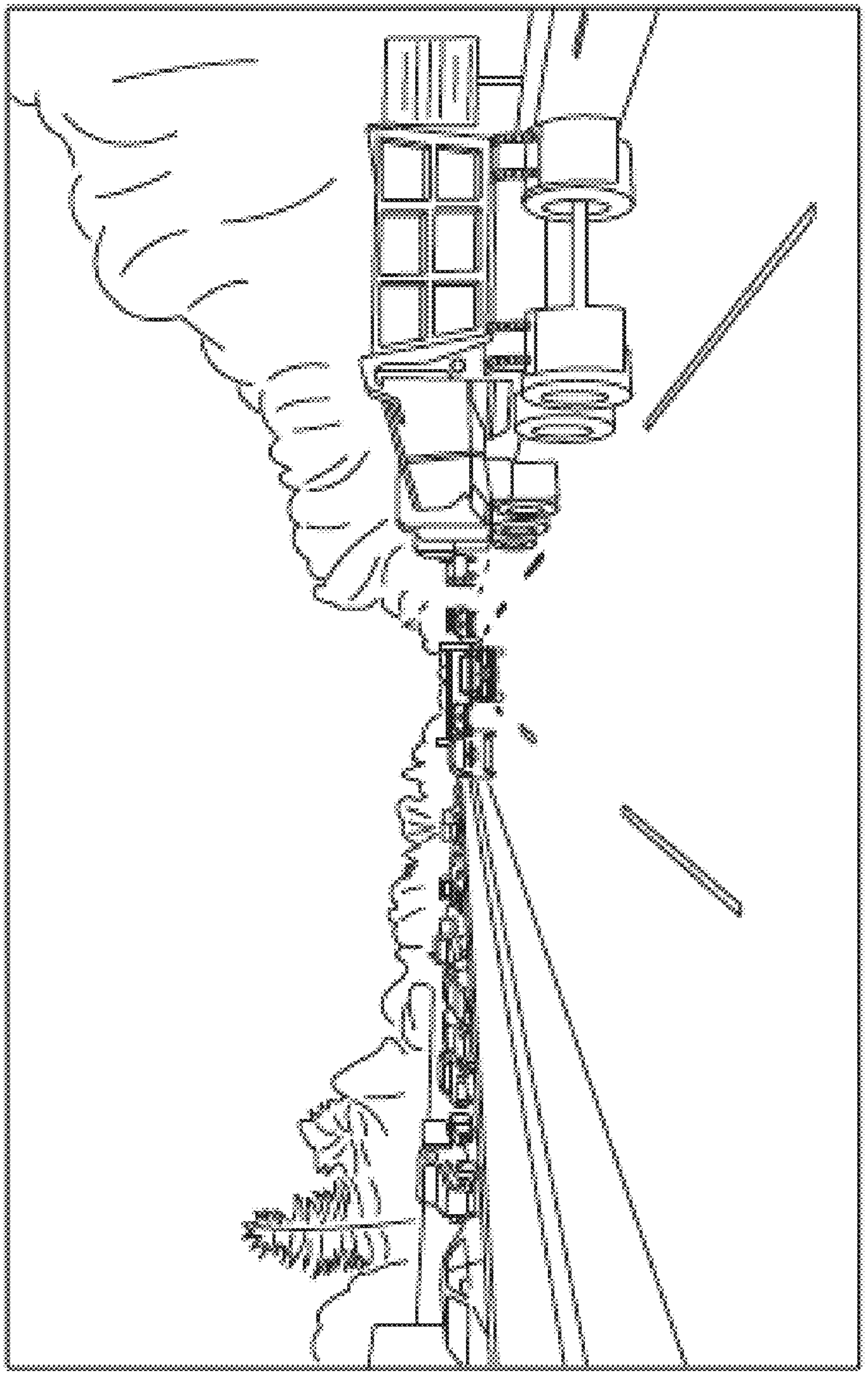
FIG. 5A illustrates an example environment in the direction of travel of an autonomous vehicle.
Figure 5B:
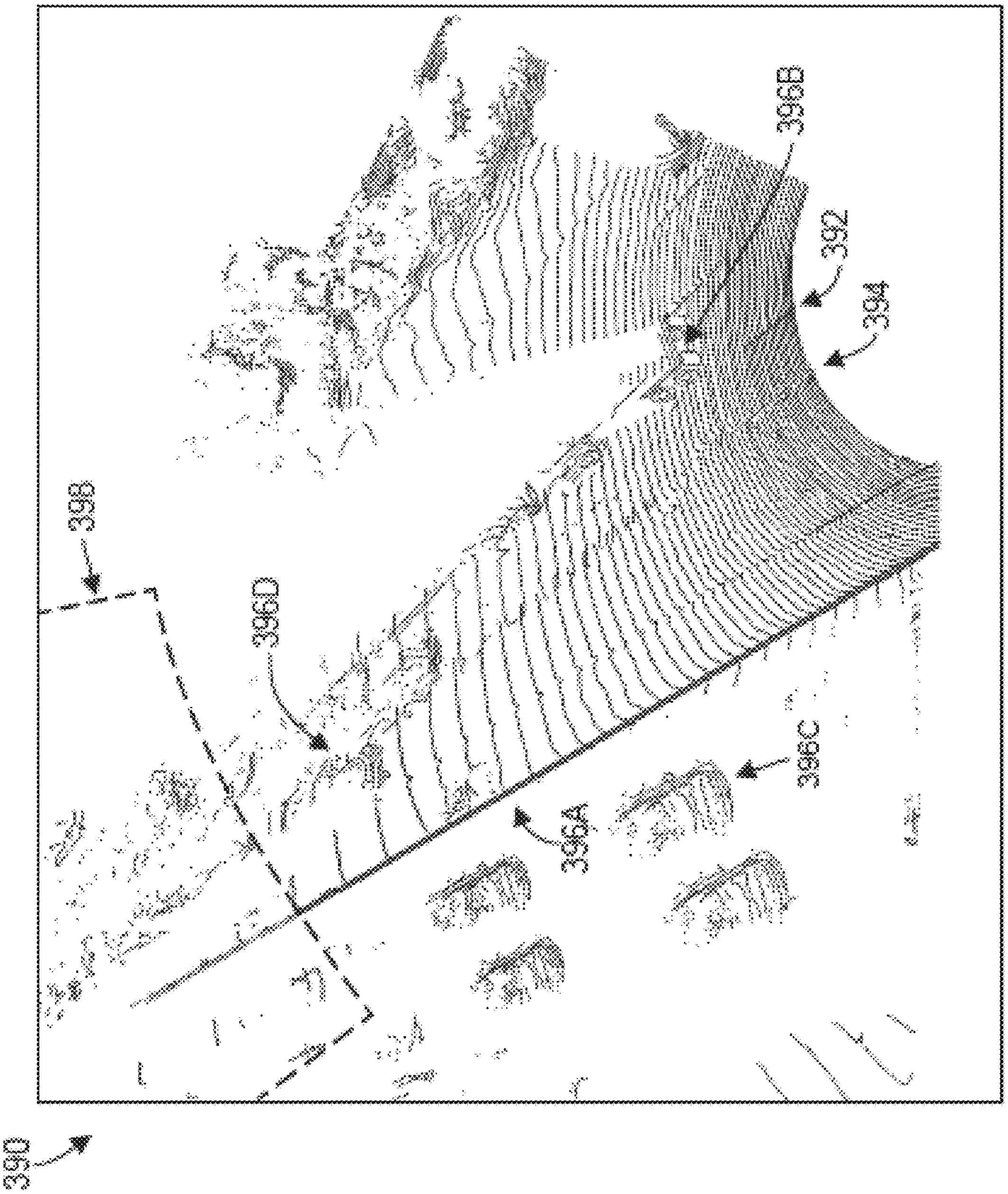
FIG. 5B illustrates an example point cloud that may be generated for the environment of FIG. 5A.
Figure 6:
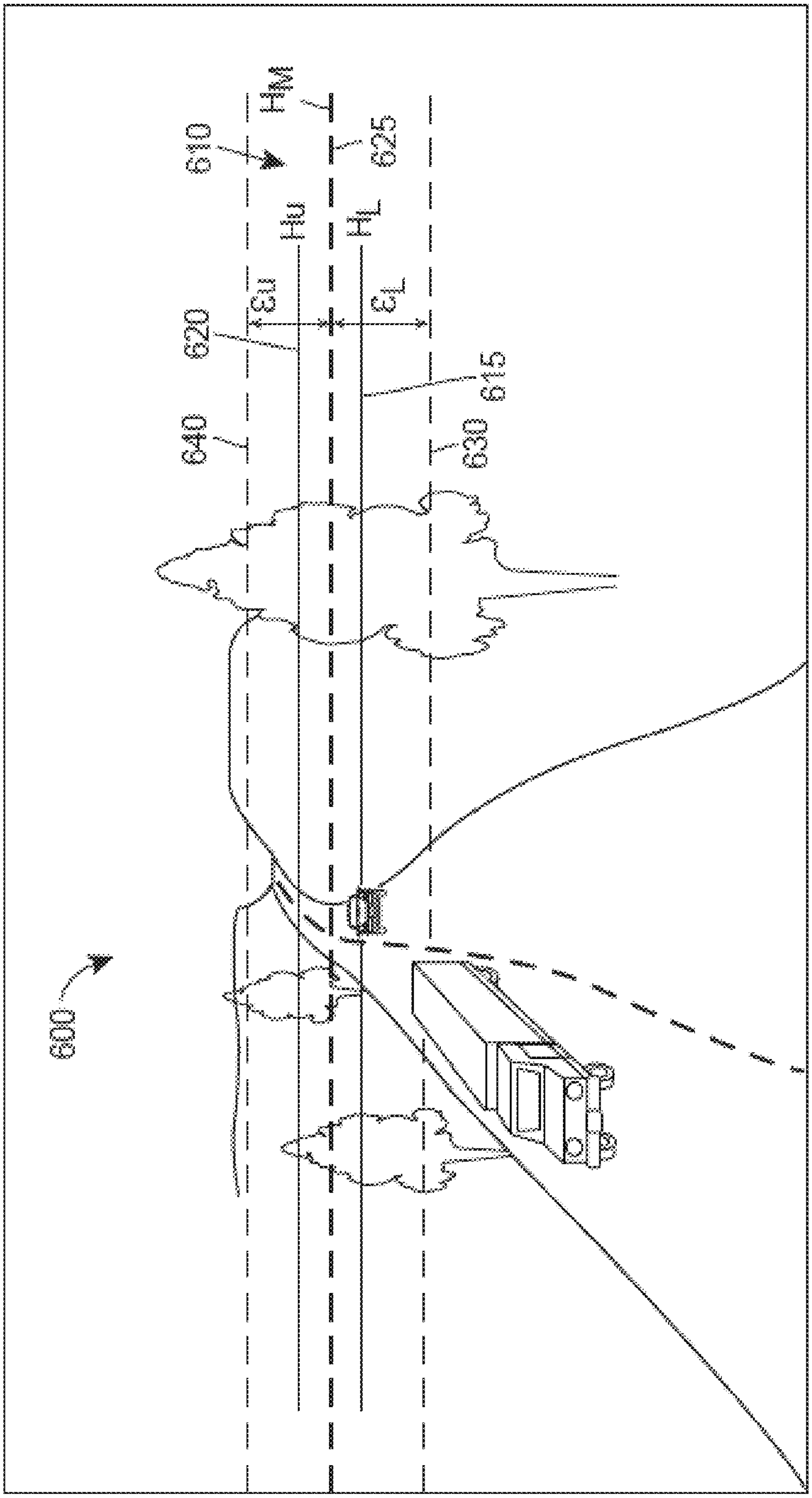
FIG. 6 illustrates an example VROI comprising a virtual horizon overlaid on an example environment within which the lidar system of FIG. 2 may operate.

FIG. 5A depicts an example real-world driving environment 380, and FIG. 5B depicts an example point cloud 390 that is generated by a lidar system scanning the environment 380 (e.g., the lidar system 200 of FIGS. 2 and 3). As seen in FIG. 5A, the environment 380 includes a highway with a median wall that divides the two directions of traffic, with multiple lanes in each direction. The point cloud 390 of FIG. 5B corresponds to an example embodiment in which two lidar devices each capture a roughly 60 degree horizontal field of regard, and in which the two fields of regard have a small overlap 392 (e.g., two or three degrees of overlap). The point cloud 390 may have been generated using two sensor heads. The point cloud 390, though merging data from more than one sensor head may assign to each point a range, an azimuth, and an elevation, with respect to a common origin point and reference look direction. The common origin may be designated as the average position and neutral look direction of the multiple sensor heads, or any other convenient point and/or look direction. While depicted as a visual image in FIG. 5B, it is understood that, in some embodiments, the point cloud 390 need not actually be rendered or displayed via a user interface.

As seen in FIG. 5B, the point cloud 390 depicts a ground plane 394 (here, the road surface) as a number of substantially continuous scan lines and also depicts, above the ground plane 394, a number of objects 396. Referring back to FIG. 1, the imaging system 100 can identify some or all of the objects 396A, 396B, 396C, 396D within the point cloud 390 using segmentation, classification, and tracking techniques. For example, the segmentation, classification, and tracking module 112 may detect substantial gaps and/or other discontinuities in the scan lines of the ground plane 394, and the module 112 may identify groups of points in the vicinity of those discontinuities as discrete objects. The segmentation, classification, and tracking module 112 may determine which points belong to the same object using any suitable rules, algorithms or models. Once the objects 396A, 396B, 396C, 396D are identified, the segmentation, classification, and tracking module 112 of FIG. 1 may attempt to classify and/or to track the objects across future point clouds similar to the point cloud 390 (i.e., across multiple point cloud frames).

In some implementations, the identified objects 396 may be used in determining and controlling the areas of focus for a lidar system (e.g., the sensor heads 308A and 308B of FIG. 4A) scanning the environment 380. On the other hand, the signals generated by the VROI detection module 110 of FIG. 1 may reduce the amount of processing and, consequently, the delay in determining the areas of focus for the lidar system. The VROI detection module 110 may use two heuristic algorithms to process the point cloud 390 (or portions of the point cloud 390) to determine (i) the lower bound of the VROI, (ii) the upper bound of the VROI, the virtual horizon, and the area of focus without using object segmentation or classification. Each of the algorithms may use at least a portion of the point cloud 390 that may correspond to a region of the physical space referred to as a receptive field 398. The example receptive field 398 is mapped onto the point cloud 390 for the purpose of illustration. The dashed line of the receptive field 398 delineates a section of the point cloud 390 that corresponds to points lying beyond a certain minimum distance from a sensor (or a group of sensors) and within a certain azimuthal range of the neutral look direction.

The lower bound of the VROI may be based at least in part on identifying, within a certain range (e.g., the receptive field 398), a subset of sensor data corresponding to the lowest angle of relative elevation. In some implementations, the subset of sensor data corresponding to the lowest angle of relative elevation may be associated with the same scan line of a lidar system. That is, the VROI detection module 110 may determine angles of relative elevation corresponding to a plurality of lidar scan lines, and the module 110 may identify a suitable scan line with the lowest angle of relative elevation.

Angles of relative elevation need not be determined with respect to a ray originating at a sensor. In some implementations, the reference point and/or ray for determining angles of relative elevation may be a specified elevation below the sensor, as discussed below. The lower bound of the VROI may be indicative of reflections from a horizontal surface (e.g., the road) in front of a vehicle, as discussed in more detail below.

The upper bound of the VROI may be based at least in part on identifying a representative elevation angle for at least a subset of sensor data within a certain range (e.g., the receptive field 398). In identifying the representative elevation angle, the imaging system 100 can weigh and aggregate contributions from each point within the subset of sensor data. Thus, in some implementations, the upper bound of the VROI may be indicative of a peak in density of data (or returns, or information) with respect to elevation. In other words, the upper bound of the VROI may be indicative of the elevation from which the majority of or the largest density of the data (within a certain receptive field) is collected by the sensor. That is, the upper bound of the VROI may be based on the heuristic that sensor data is more concentrated in elevation near the elevation of the horizon and slightly above it.

FIG. 6 illustrates a scene 600 within which the VROI detection module 110 may identify a VROI 610. To that end, the VROI detection module 110 may generate a lower bound 615 and an upper bound 620 of the VROI 610 based on the algorithms briefly discussed above and discussed in more detail below, in the context of FIGS. 9-12. The scene 600 may correspond to a scene subtended by an FOR of a sensor, such as for example the FOR of lidar system 200 illustrated in FIG. 3. The scene 600 may also represent a combination of FORs of multiple sensor heads (e.g., the sensor heads 308A and 308B of FIG. 4A. The scene 600 depicts the observed driver environment (analogous to driving environment 380) rather than the point cloud 390 for the purpose of illustrating a possible context for detecting a VROI based on the lower estimate 615 and the upper estimate 620 of horizon elevation. In some implementations, a visual indication of the lower estimate 615 and the upper estimate 620 of horizon elevation need not be generated to adjust sensor parameters. In other implementations, lines or other visual indications of at least one of the lower estimate 615 and the upper estimate 620 of the horizon may be overlaid on a display of a point cloud (i.e., source data for the horizon estimates) generated by a sensor or on a video display of a camera view suitably aligned with the FOR of the sensor.

The VROI detection module 110 may combine the lower estimate 615 and the upper estimate 620 of horizon elevation to generate a middle estimate 625 of horizon elevation angle or, more concisely, an estimated horizon angle. In some implementations, the VROI detection module 110 may compute the estimated horizon 625 as the average of the lower estimate 615 and the upper estimate 620 of horizon elevations. In other implementations, a weighted average of the lower estimate 615 and the upper estimate 620 of horizon elevations yields the estimated horizon 625, depending on the corresponding confidence measures for the lower 615 and upper 620 estimates, as discussed below. Furthermore, the VROI detection module 110 may compute a measure of confidence for the estimated horizon 625, based, for example, on the difference between the lower estimate 615 and the upper estimate 620 of horizon elevations. For example, a difference of less than 1°, 2° or any suitable angular range may indicate a high confidence in the estimated horizon 625, while the difference of more than 2°, 3°, 4° or any suitable angular range may indicate a low confidence in the estimated horizon 625. If the measure of confidence (which may be referred to as a metric of uncertainty) exceeds a particular threshold angular value (e.g., 3°), then the scan pattern may be set to a default scan pattern. A default scan pattern may be a scan pattern that includes a particular distribution of scan lines (e.g., as illustrated in FIG. 7A, 7B, 8A, or 8B). One or more default scan patterns may be stored within a lidar system (e.g., the lidar system 200), and the lidar system may switch to one of the default scan patterns when there is a low confidence in the estimated horizon 625.

The VROI detection module 110 may determine an extended lower boundary 630 of the VROI 610 based on the estimated horizon 625 by subtracting a lower angular margin, $\varepsilon_L$, from the estimated horizon 625. Analogously, the VROI detection module 110 may determine an extended upper boundary 640 of the VROI 610 based on the estimated horizon 625 by adding an upper angular margin, $\varepsilon_L$, to the estimated horizon 625. In some implementations, the lower and upper angular margins may be equal. Furthermore, the lower and upper angular margins may be calculated in view of the measure of confidence for the estimated horizon 625. In some implementations, the margin $\varepsilon=\varepsilon_L=\varepsilon_U$, may be set to the angular difference between the lower estimate 615 and the upper estimate 620 of horizon elevations. Generally, the VROI detection module 110 may set the extent of the VROI 610 (e.g., the difference between the extended upper boundary 640 and the extended lower boundary 630), to a larger value when the confidence in the estimated horizon 625 is low and to a smaller value when the confidence in the estimated horizon 625 is high.

The extended lower boundary 630 and extended upper boundary 640 of the VROI 610 may be included in the perception signals 106 sent by the perception component 104 to the sensor control component 130 of FIG. 1. The parameter adjustment module 136 of the sensor control component 130 may then adjust the parameters of the sensors 102. For example, the sensor control component 130 may adjust the FOR of a lidar (e.g., the lidar system 200). Additionally, or alternatively, the parameter adjustment module 136 may adjust a scan pattern (e.g., the scan pattern 260) of the lidar.

Figure 7A:
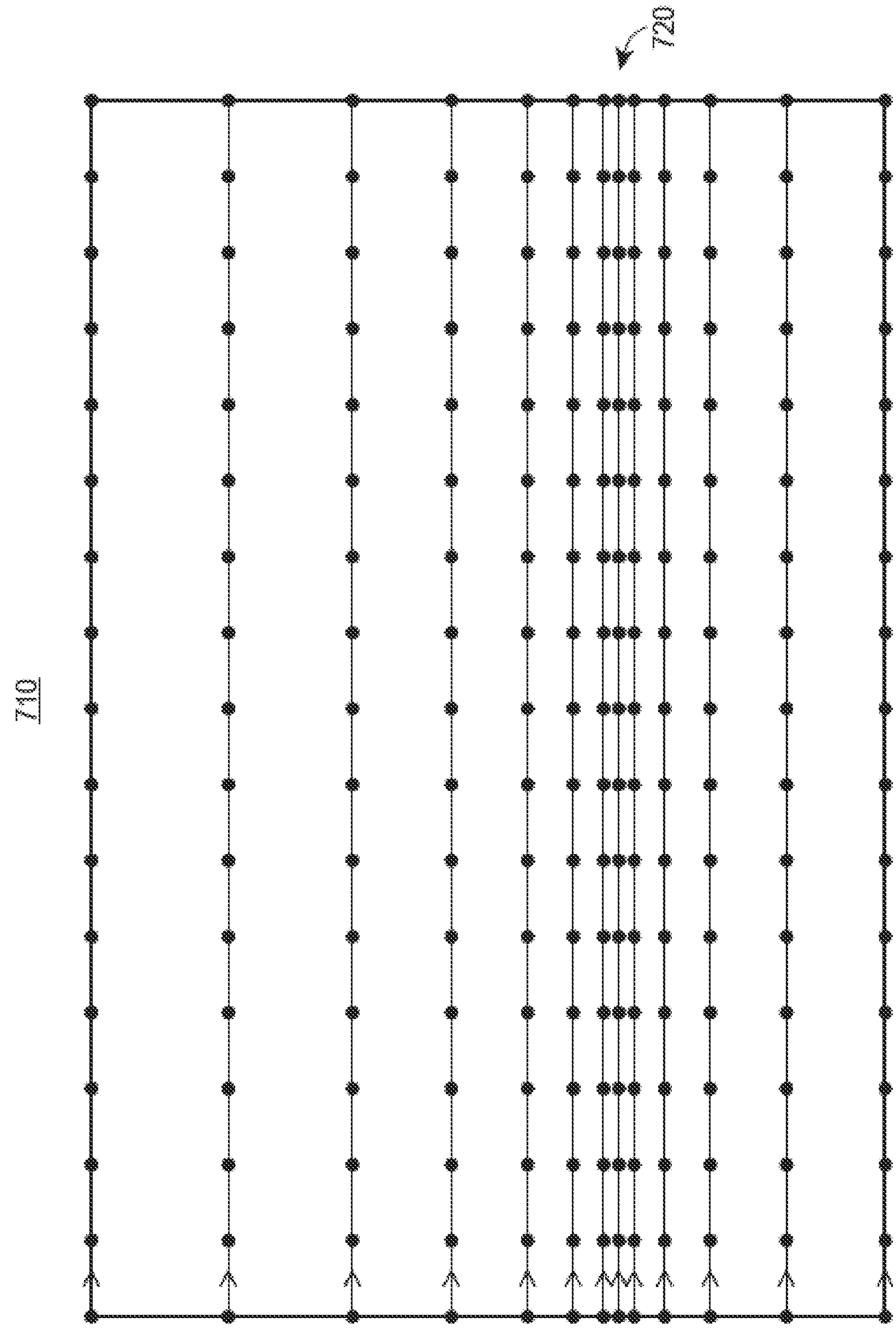
FIG. 7A illustrates an example scan pattern with scan line distribution adjusted based on the VROI.

FIG. 7A illustrates a scan pattern 710 adjusted by the parameter adjustment module 136 in response to the VROI parameters generated by the VROI detection module 110 and included in the perception signals 106. Scan line 720 may represent the scan line at the elevation angle of the estimated horizon 625, with the line density gradually decreasing with the elevation angle deviation from the estimated horizon 625. The width of the peak in the angular distribution of scan lines may be based on the confidence in the estimated horizon 625, with the scan line distribution widening when the confidence decreases.

Figure 7B:
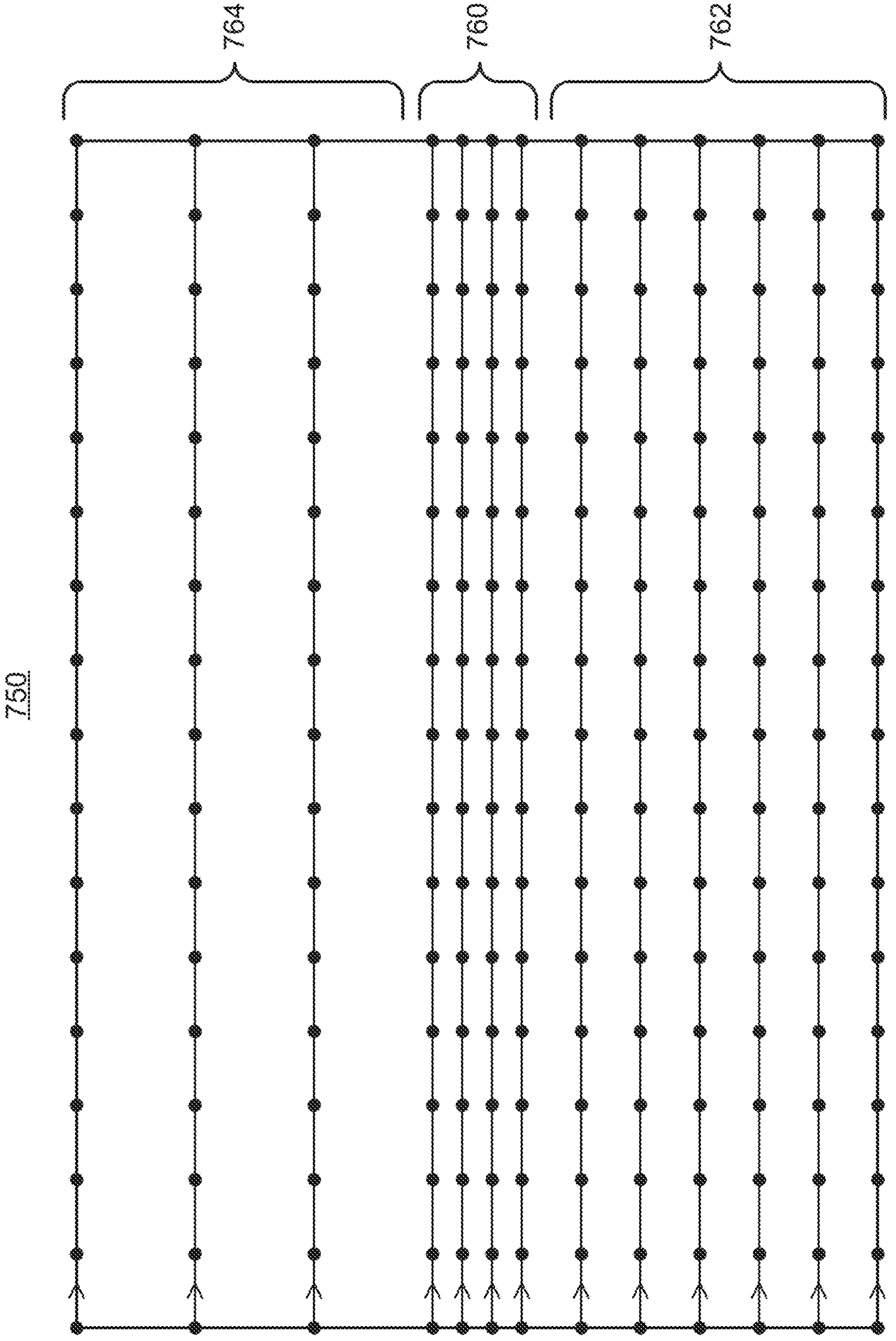
FIG. 7B illustrates another example scan pattern with scan line distribution adjusted based on the VROI.

FIG. 7B illustrates another scan pattern 750 adjusted by the parameter adjustment module 136 in response to the VROI parameters generated by the VROI detection module 110. The scan pattern 750 includes three regions that may be designated as a horizon region 760, a road region 762, and a sky region 764. The horizon region 760, with the largest scan line density with respect to elevation may correspond to the VROI 610 determined by the VROI detection module 110. The road region 762 may have a lower scan line density than the horizon region 760, but higher than the sky region 764.

The parameter adjustment module 136 may configure other density distributions of scan lines based on parameters generated by the VROI detection module 110. The distributions may include one or more regions of uniform scan line densities and/or regions of variable scan line densities.

Figure 8A:
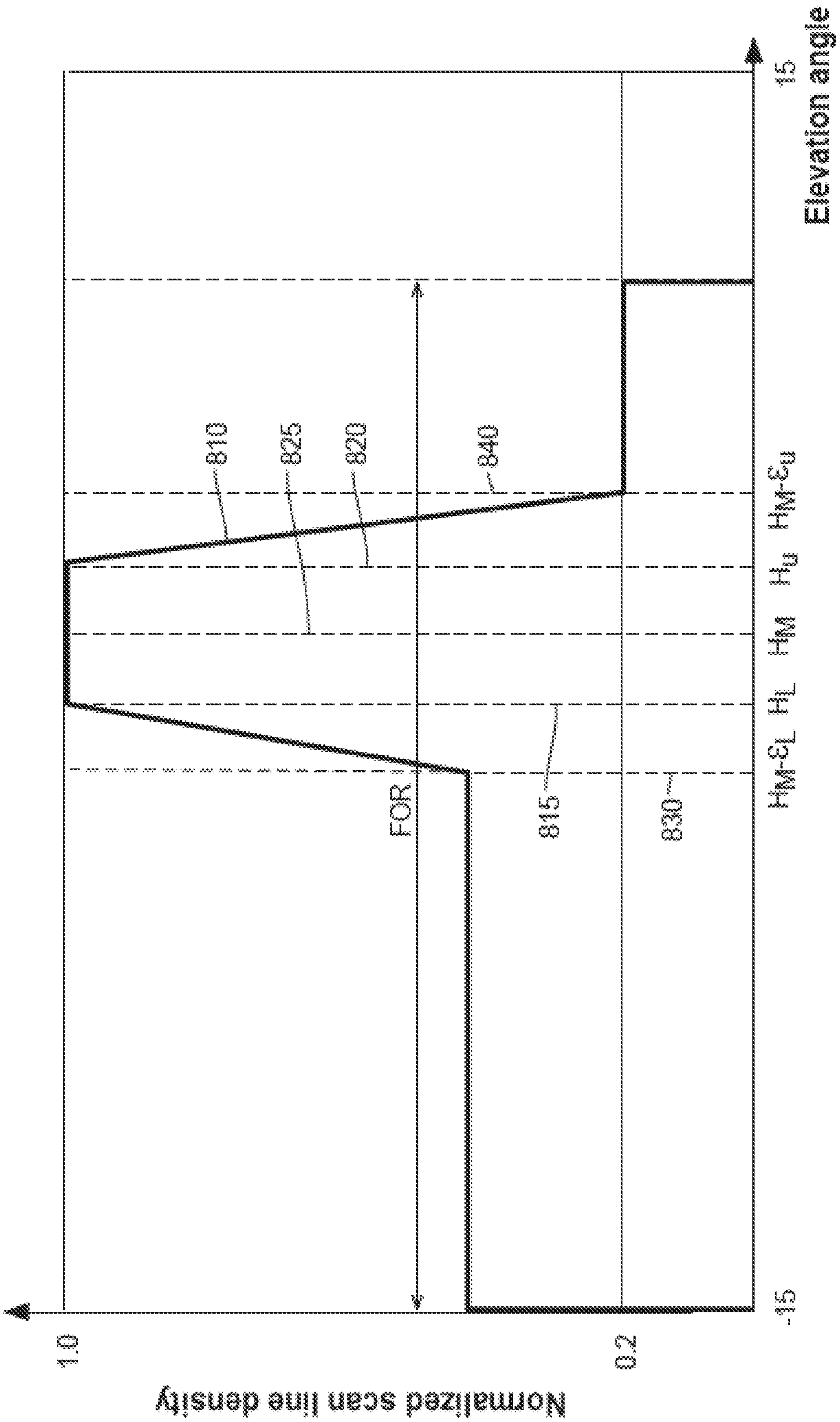
FIG. 8A illustrates an example scan line distribution function adjusted based on the VROI.
Figure 8B:
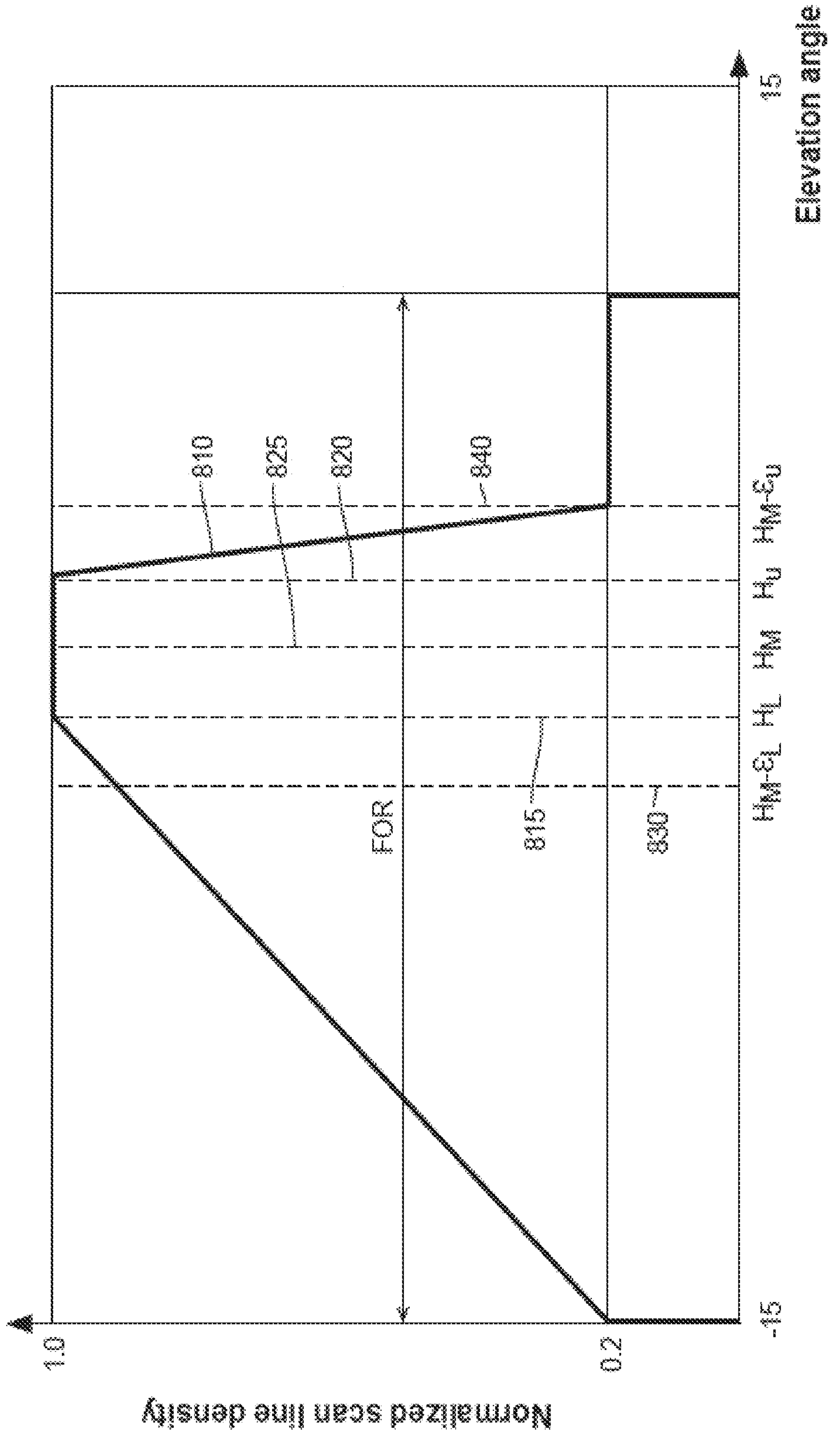
FIG. 8B illustrates another example scan line distribution function adjusted based on the VROI.

FIGS. 8A and 8B are graphical representations of a possible scan line density distribution 810 as a function of elevation angle with respect to a neutral look direction (e.g., reference line 262) of a sensor (e.g., lidar system 200). The sensor control component 130 may set the distribution 810 based on elevation angles determined by the VROI detection module 110. A lower horizon estimate line 815 and an upper horizon estimate line 820 may correspond to the lower estimate 615 and the upper estimate 620 of the horizon elevation, respectively. A horizon line 825 may correspond to the determined horizon elevation 625. An extended lower VROI boundary line 830 and an extended upper VROI boundary line 840 may correspond to the extended lower 630 and the extended upper boundary 640 of the VROI 610. As illustrated in FIG. 8A, the distribution 810 may include, for example, a low-elevation "road" region between the lowest angle and the extended lower VROI boundary line 830, a center uniform-density region between the lower horizon estimate line 815 and the upper horizon estimate line 820, and a high-elevation uniform-density region between the extended lower VROI boundary line 840 and the highest angle in the scan pattern. The uniform density regions may be linked by varying (e.g., linearly) scan line density regions. The unit value of normalized scan line density may correspond to 2, 5, 10, 20, 50 or any other suitable number of scan lines per one degree of elevation angle. In some implementations, the center uniform-density region may be set to coincide with the VROI (e.g., VROI 610) determined by the VROI detection module 110. The high-elevation uniform-density region, similarly to the sky region 764 in FIG. 7B, may have a relatively low scan line density, that is lower by a factor of 2, 5, 10 or any other suitable factor than the peak scan line density. The angular extent of transitions (between lines 820 and 840 as well as between lines 830 and 815) may depend on the measure of confidence in the estimate of the virtual horizon, and, correspondingly, on the angular difference between lower and upper bounds of the VROI (e.g., bounds 615 and 620). As illustrated in FIG. 8B, a low-elevation variable-density region between the lowest angle and line 815 may be configured to cover the road region (e.g., the road region 762) in front the sensor with the angular density of scan lines increasing farther away from the vehicle. The angular distribution of scan lines in FIGS. 8A and 8B may improve accuracy of the analysis of the driving environment by the segmentation, classification, and tracking module 112, allowing more accurate prediction of the driving environment by the prediction component 120.

Figure 9:
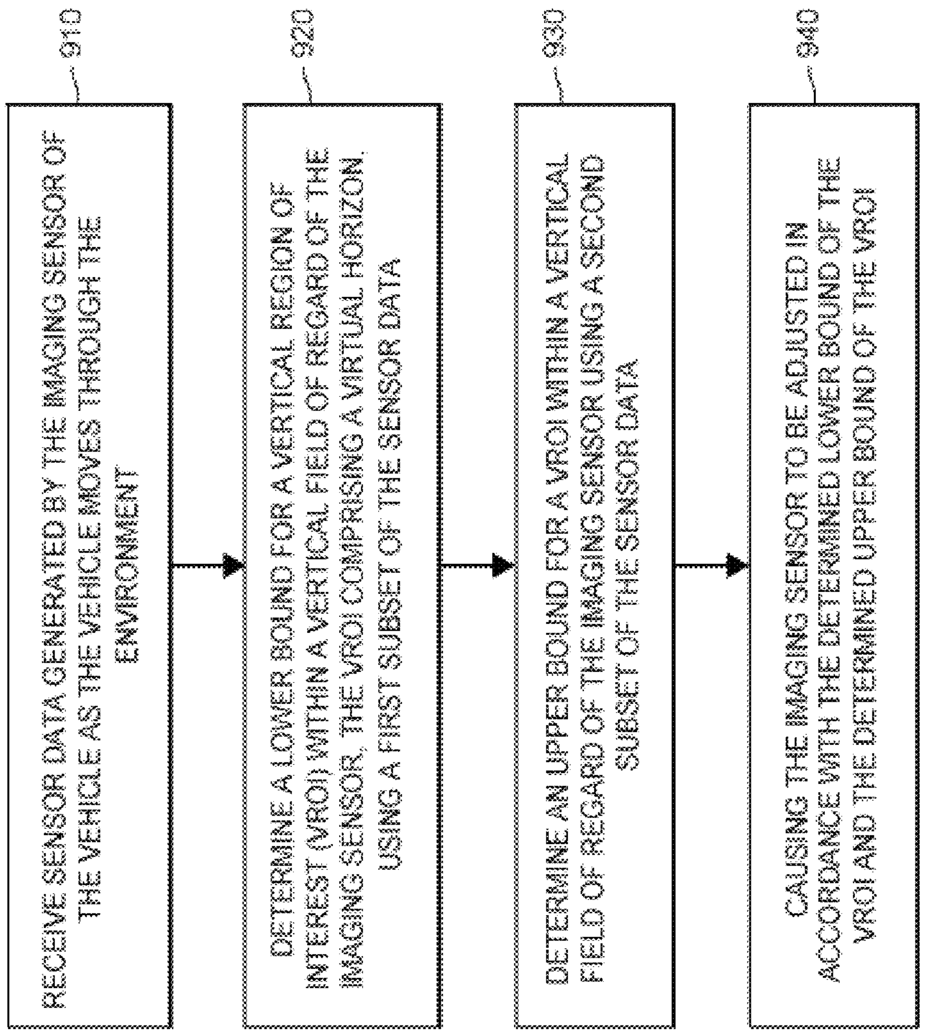
FIG. 9 is a flow diagram of a method for determining VROI.

To maintain the desired scan line distribution with respect to the driving environment, an imaging system may implement a method 900 according to a flow diagram illustrated in FIG. 9. For clarity, the method 900 is discussed below primarily with reference to the imaging system 100 of FIG. 1 as well as the examples of FIGS. 10-12.

At block 910, the imaging system 100 can receive sensor data generated by an imaging sensor (e.g., lidar system 200 of FIG. 2, or a combination of sensor heads such as the sensor heads 308A and 308B of FIGS. 4A,B) of a vehicle (e.g., vehicle 300) as the vehicle moves through an environment (e.g., the driving environment 380). In some implementations, the VROI detection module 110 discards the received sensor data that falls outside of a receptive field (e.g., the receptive field 398), prior to subsequent processing by the VROI.

To determine the lower bound and the upper bound of the VROI, the VROI detection module may select from the received sensor data the first subset for determining the lower bound and the second subset for determining the upper bound of the VROI, as described below.

At block 920, the VROI detection module 110 determines a lower bound of the VROI based at least in part on detecting a suitable subset of the received sensor data. In some implementations, the suitable subset may have a minimum relative elevation metric. To that end, the VROI detection module 110 may first identify a plurality of subsets of data (e.g., grouped by corresponding lidar scan lines), each associated with a certain corresponding elevation with respect to a neutral look direction of the imaging sensor. For each of the identified subsets of data, the VROI detection module 110 may select the points in the receptive field, and assign a weight to each point in the subset based on the location of the point in the receptive field. Subsequently, the VROI detection module 110 may use the weighted contributions of the points in each subset to compute corresponding relative elevation metrics for the subsets, and select the subset with the minimum relative elevation metric.

Figure 10A:
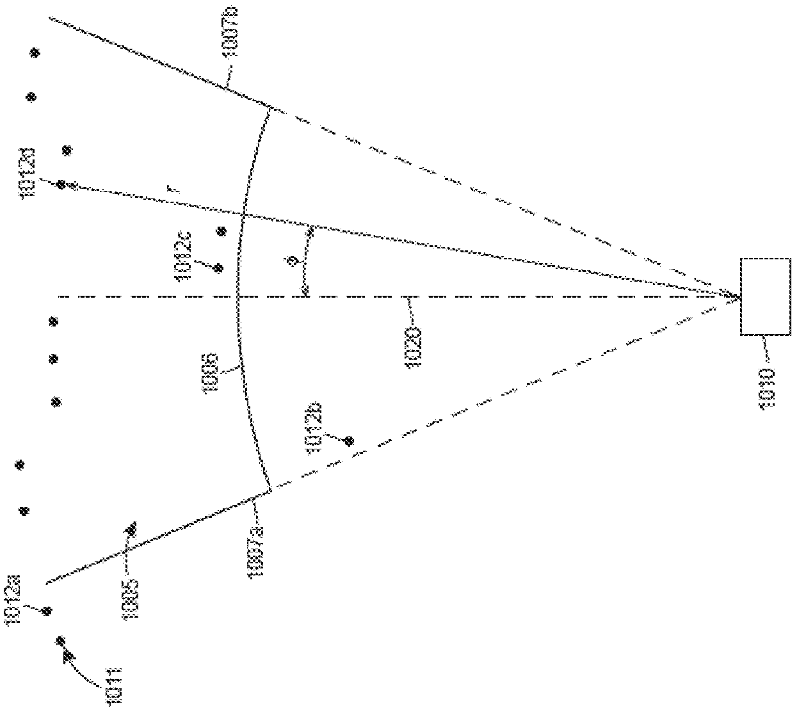
FIG. 10A illustrates a receptive field and selection of a first subset of sensor data for evaluating the lower bound of the VROI.

An example of assigning weights to points in a subset of data corresponding to a lidar scan line is discussed in the context of FIG. 10A. FIG. 10A illustrates a top view of an example receptive field 1005 for selecting subsets of data collected by a lidar system 1010 (e.g., lidar system 200 of FIG. 2, or a combination of sensor heads such as the sensor heads 308A and 308B of FIGS. 4A,B) to be used by the VROI detection module. The receptive field 1005 may be bounded by a minimum range line 1006 and azimuthal bounds 1007*a,b*. The receptive field 1005, Ω, may be expressed as:

$$\Omega=\{p_i|\forall p_i P: (|\emptyset_i|\leq\emptyset_{max})\&(r_i\geq r_{min})\}, \qquad \text{Eq. 1.}$$

as a set of all points, $p_i$ with index i in a full set of points in a frame, P, that have an azimuthal angle, $\emptyset_i$, with respect to a neutral look direction line 1020 that is no greater than some maximum absolute value azimuthal deviation, $\emptyset_{max}$, and that have a range, $r_i$, no less than a minimum range, $r_{min}$. An example set 1011 of 14 data points represents points from a single scan line of the lidar system 1010, with example points 1012*a,b* lying outside of the receptive field 1005 and example points 1012*c,d* lying within the receptive field 1005.

The VROI detection module 110 may assign a weight to each data point within the receptive field 1005, for example, to give more influence to points farther away from the lidar system 1010 and closer in azimuthal angle to the neutral look direction line 1020. For example, a weight for a point with index j may be:

$$w_j = r_j(\varnothing_{max} - \varnothing) \quad \text{Eq. 2.}$$

where $r_j$ is the distance from the lidar system 1010, $\varnothing_{max}$ is the absolute value of the maximum azimuthal deviation from the neutral look direction line 1020 (e.g., as defined by azimuthal bounds 107*a,b*), and $\varnothing_j$ is the absolute value of the azimuthal deviation for the point in question. In this example, the weight of a point close to one of the azimuthal bounds 1007*a,b* approaches zero.

Figure 10B:
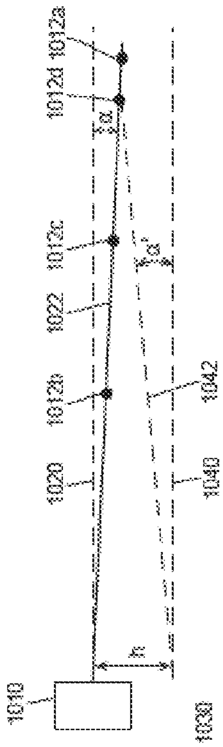
FIG. 10B illustrates using relative elevation for determining the lower bound of the VROI.

FIG. 10B is a lateral view of lidar data discussed in the context of FIG. 10A above. FIG. 10B helps illustrate a method by which the VROI detection module 110 may use the weighted points to compute a metric of relative elevation for the subset of scan line points lying within the receptive field 1005. The points 1012*a-d*, as described above, may belong to the same scan line, represented by the elevation direction 1022. Thus, the points 1012*a-d* have the same elevation angle, a, with respect to the neutral look direction 1020 from the perspective of the lidar system 1010. For each point, a relative elevation angle, α', may be defined, for example, as an elevation with respect to a direction 1040 parallel to the neutral look direction 1020 from the perspective of a reference point 1030 lying an offset height, h, below an aperture of the lidar system 1010. For each point with index j, the relative elevation angle may be computed as:

$$\alpha'_j = \alpha 0 + A\ \tan((h + h_j)/d_j), \quad \text{Eq. 3.}$$

where $\alpha_0$ is a suitable constant offset angle (e.g., that may be used to ensure positive relative elevation angles), $h_j$ is a height of the point with respect to the neutral look direction 1020, $d_j$ is the distance of the point from the lidar system 1010 along the neutral look direction 1020. The height of the point may be estimated as $h_j = d_j \tan(\alpha_j)$ or $h_j = r_j \tan(\alpha_j)$, depending on an implementation, where $\alpha_j$ is the elevation angle of the point (which may be the same $\alpha_j = \alpha$ for all the points in the scan line) with respect to the neutral look direction 1020 and $r_j$ is the distance from the lidar system 1010. The offset height, h, may be chosen to be a suitable factor (e.g., 1, 2, 3) of the height of the lidar aperture with respect to ground. When the factor is 2, the reference point 1030 may represent a mirror point of the lidar aperture with respect to ground.

The VROI detection module 110 may compute the relative elevation for the lidar line as a weighted mean (e.g., harmonic, arithmetic, geometric) of relative elevation angles for every point of the scan line that falls within the receptive field 1005, as discussed above. For example, for a scan line of index k, comprising points with relative elevations $\alpha'_j$ and weights $w_j$, the relative elevation angle may be computed as:

$$\alpha'_k = (\Sigma_j w_j) / \Sigma_j (w_j / \alpha'_j) \quad \text{Eq. 4.}$$

The VROI detection module 110 may subsequently select a scan line with the minimum relative elevation $\min(\alpha'_k)$ and use the elevation of the scan line as the lower bound of the VROI. In some implementations, the elevations $\alpha_j$ may not be the same for all the points in the scan line, and the VROI detection module may use a weighted mean (e.g., arithmetic average with weights $w_j$) of the elevations $\alpha_j$ as the elevation of the scan line. In some implementations, where the elevations $\alpha_j$ are not the same for all the points in the scan line, the VROI detection module 110 may average the elevations $\alpha_j$ as the elevation of the scan line. In some implementations, scan lines that do not have a minimum number of data points (e.g., 2, 5, 10, 2, or any suitable number) within the receptive field 1005 may be removed from consideration for determining the lower bound of the VROI.

Returning to the method 900 in FIG. 9, at block 930 the VROI detection module 110 may determine the upper bound of the VROI using the second subset of the sensor data. The VROI detection module may assemble the second subset of the sensor data from multiple lidar scan lines. In some implementations, the VROI detection module 110 may determine the upper bound of the VROI based on the set of all points in the point cloud frame that fall within a receptive field (e.g., the receptive field 1005). Thus, the second subset may be larger than the first subset, and may fully include the first subset. The VROI detection module may compute the upper bound of the VROI as an aggregate elevation angle of the second subset, according to the techniques described below. As with determining the lower bound of the VROI, the VROI detection module may assign weights to points, emphasizing the points azimuthally closer to the neutral look direction of the lidar, and farther from the lidar. In some implementations, the receptive field for determining the upper bound of the VROI may be different from the receptive field for determining the lower bound of the VROI. Likewise, in some implementations, the weights of the points within the receptive field for determining the upper bound of the VROI may have a different dependence on azimuth angle and range from the weights of the points within the receptive field for determining the upper estimate.

Figure 11A:
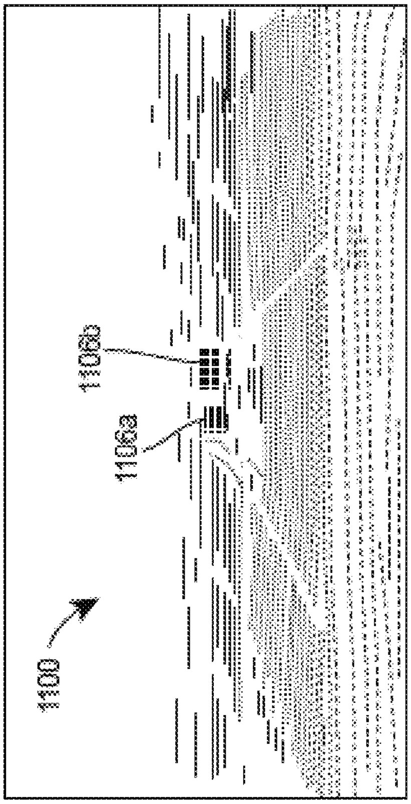
FIGS. 11A-B illustrate selecting a second subset of sensor data for evaluating the upper bound of the VROI.
Figure 11B:
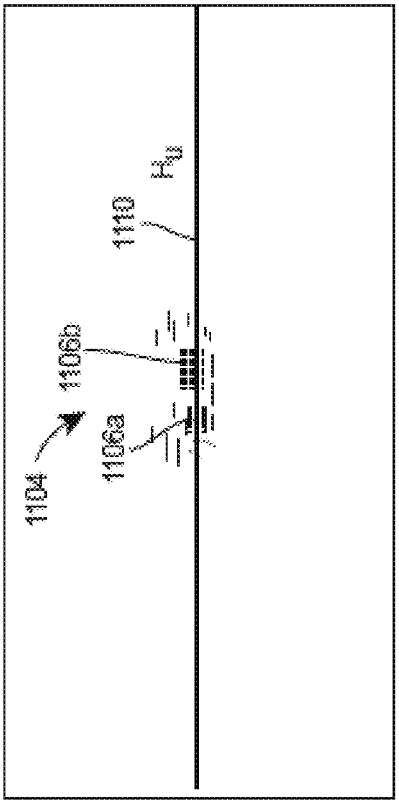
Figure 11C:
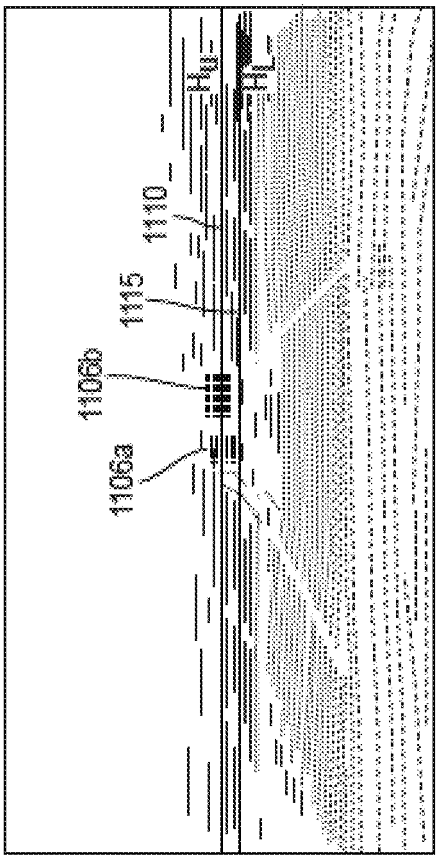
FIG. 11C illustrates displaying the lower and upper bounds of the VROI over the sensor data.

Determining the upper bound of the VROI may be considered in the context of FIGS. 11A-C. FIG. 11A illustrates a set of sensor data 1100 that may represent a lidar point cloud. FIG. 11B illustrates a second subset 1104 for determining the upper bound of the VROI. The VROI detection module may compute the upper bound elevation angle, β, as:

$$\beta = (\Sigma_i w_i) / \Sigma_i (w_i / (\alpha_i + \alpha_0)) - \alpha_0 \quad \text{Eq. 5.}$$

where the summation is over all i, representing the points in the receptive field (i.e., such that $p_i - \Omega$), $w_i$ is a corresponding weight, $\alpha_i$ is a corresponding elevation angle, and $\alpha_0$ is a suitable offset angle such that $\alpha_i + \alpha_0$ is always positive. After computing the harmonic mean, the offset angle, $\alpha_0$ is subtracted to shift the angles back to the original frame of reference with respect to the neutral look direction. In some implementations, the VROI detection module 110 may compute the upper bound of the VROI as the aggregate elevation angle computed as an average of elevation angles of the points within the second subset. Returns from distant objects (e.g., point clusters 1106*a,b*) may considerably influence the determination of the upper bound of the VROI. The imaging system 100 may display the upper bound as an upper horizon indicator 1110 of the weighted harmonic mean of the second subset 1104.

Once the VROI detection module 110 determines the lower bound of the VROI and the upper bound of the VROI, the imaging system 100 can display one or both of the computed VROI bounds overlaid with point cloud data on a display, as illustrated in FIG. 11C. The display may show changing upper and lower bounds in real time or the sensor control architecture may store the determined bounds and point cloud data for displaying at another time. The upper horizon indicator 1110 and/or the lower horizon indicator 1115 representing, correspondingly, the upper and lower bounds of the VROI may provide a visual output for the method 900 of determining the VROI. However, the imaging system 100 in general need not display via a user interface any other values generated during execution of the method 900, and FIG. 11C illustrates merely one example implementation in which the imaging system 100 provides a visualization of the estimates of the virtual horizon, the lower bound, and the upper bound to an operator conducting training of the machine learning model or to a passenger of the self-driving vehicle, for example.

At block 940, the imaging system 100 may adjust the imaging sensor in accordance with the determined lower bound of the VROI and the determined upper bound of the VROI. For example, the imaging system 100 may adjust a vertical field of regard of the imaging sensor (e.g., $FOR_v$ of the lidar system 200) in one or more ways. The imaging system 110 may adjust the neutral look direction of the imaging sensor to fall within the determined VROI. For example, the imaging system 100 with an image sensor subtending vertical look directions from −15° to 15° in the frame of reference of the vehicle, may determine a VROI bounded by the −5° and −3° look directions. The imaging system 100 may then adjust the imaging sensor to center on the VROI and subtend −19° to 11° with respect to the vehicle. Alternatively, when the imaging system 100 includes a lidar system (e.g., the imaging sensor is the lidar system 200), the imaging system 100 may adjust vertical density of scan lines (e.g., as illustrated in FIGS. 7A-B and 8A-B) to have higher density in the VROI region between −5° and −3°. Still, in some implementations, in response to one or multiple VROI determinations, the imaging system 100 may adjust the lidar system scan pattern by reducing or increasing the size of the $FOR_v$. For example, the imaging system 100 may reduce the size of the $FOR_v$ (e.g., from 30 to 25 or 20 degrees) in response to VROI staying consistently and with high confidence close to the center of the $FOR_v$. Conversely, the imaging system 100 may increase the size of the $FOR_v$ (e.g., to 35 or 40 degrees) when VROI determination varies considerably, for example, because of a hilly roadway, and/or a frequently changing scene in front of the vehicle.

Figures 12A, 12B, 12C:
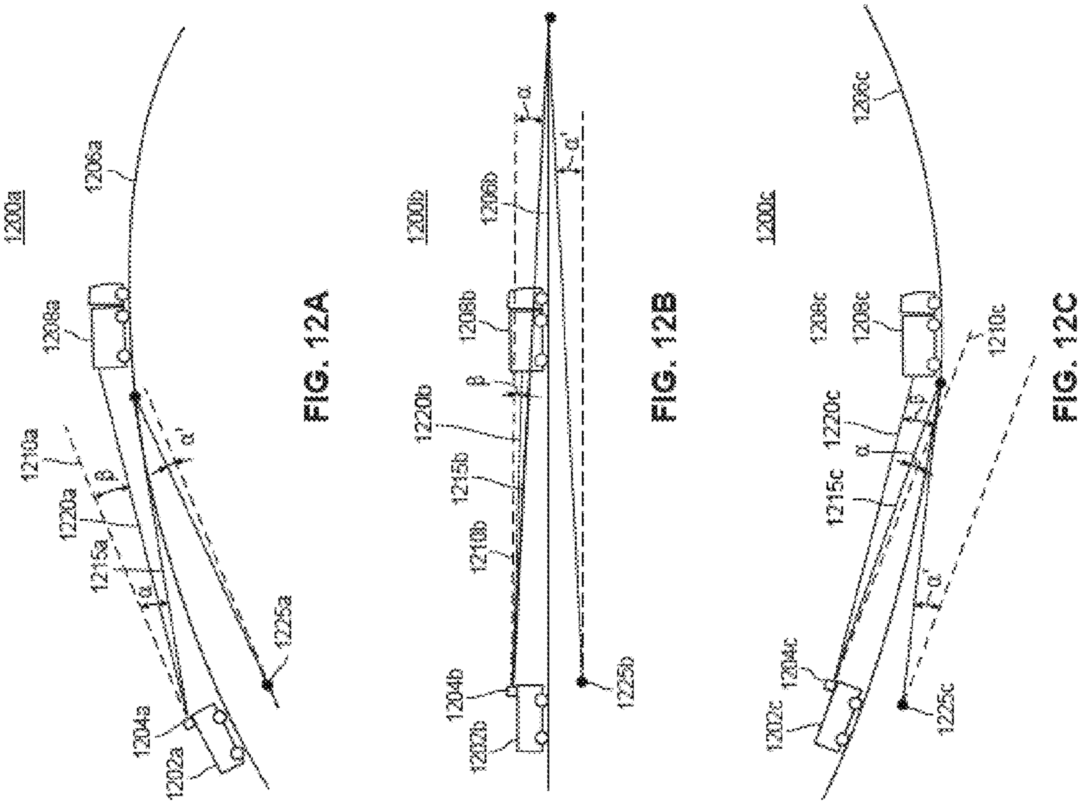
FIGS. 12A-C illustrate the application of algorithms for determining upper and lower bounds of the VROI in driving environments with different road configurations.

For further clarity, FIGS. 12A-C illustrate the application of algorithms for determining upper and lower bounds of the VROI in driving environments 1200*a-c* with different road configurations. Vehicles 1202*a-c* with corresponding sensors 1204*a-c* may move along corresponding roads 1206*a-c*. The sensors 1204*a-c* may be lidar sensors that collect data indicative of the substantially horizontal surfaces of the corresponding roads 1206*a-c* as well as from the corresponding objects 1208*a-c* substantially above the road surfaces. Neutral look direction 1210*a-c* of the sensors 1204*a-c* may substantially miss the VROIs that lie between look directions 1215*a-c* corresponding to VROI lower bounds and look directions 1220*a-c* corresponding to VROI upper bounds.

For non-concave road configurations in the FIGS. 12A-B, the VROI lower bound look directions 1215*a,b* may correspond to the substantially most distant points on the corresponding roads 1206*a,b* within the ranges of the corresponding sensors 1204*a,b*. As discussed above, the corresponding VROI lower bounds may correspond to lidar scan lines with substantially minimized relative elevation angles, α', with respect to reference points 1225*a,b*. The VROI upper bound look directions 1220*a,b* may be substantially influenced by the objects 1208*a,b* above the road surface.

On the other hand, the concave road configuration in FIG. 12C may leave many visible points on the road 1206 c that are farther than the subset of sensor points corresponding to the substantially minimized relative elevation angle, α', with respect to the reference point 1225*c*. The rising section of the road 1206*c* may considerably contribute to the influence of the object 1208*c* in raising the upper bound of the VROI and the corresponding look direction 1220*c*, increasing the VROI.

In some implementations, it may be advantageous to limit the situations in which the VROI is dynamically determined and default to a fixed scan pattern or to adapt the intensity of the horizon focus depending on the current scene. One reason to do this is the case where horizon detection fails and the lidar focuses most of the lines on the wrong vertical elevation, this can lead to a false negative detection of an obstacle and to a hazard. The horizon is not always detectable for the lidar. For example, the horizon can be fully or partially occluded by a leading vehicle, as described more fully below.

In some implementations, an operational design domain (ODD) may be defined for which horizon control is active. If the system is outside of the ODD, a predefined static scan pattern with a broader distribution of all scan lines is used instead of the above described dynamically adjusted scan pattern.

Examples of cases that are outside of the ODD include situations where the actual horizon is obstructed by vehicles in front of the ego vehicle or by environmental conditions. FIGS. 13A-13D are plan views of a roadway illustrating example cases where horizon control may or may not be used.

Figure 13A:
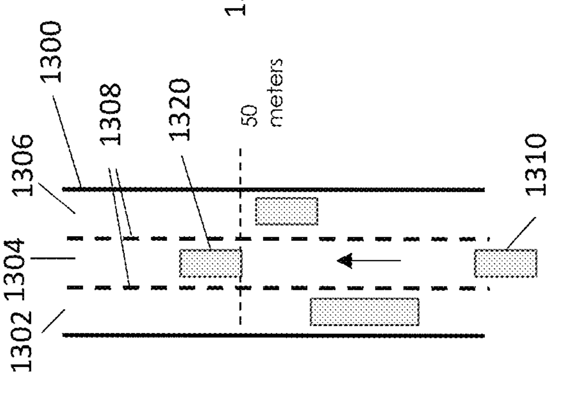
FIGS. 13A-D illustrate road conditions affecting horizon visibility.

In FIG. 13A, a three-lane roadway 1300 is shown, with lanes 1302, 1304 and 1306 and lane markers 1308 dividing the three lanes. Traffic flows in the direction of the arrow. The ego vehicle 1310 is in the middle lane 1304 and there is a lead vehicle 1320, the rear of which is 50 meters ahead of the ego vehicle 1310. The lead vehicle 1320 is narrow enough that the ego vehicle 1310 has a clear view of the lane markings 1308 beyond the lead vehicle 1320.

Figure 13B:
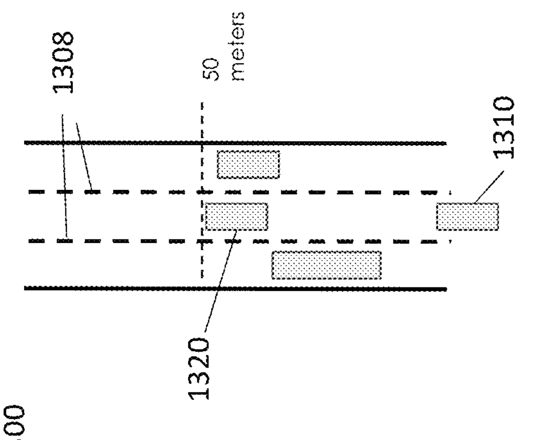

In FIG. 13B, the rear of the lead vehicle 1320 is closer than 50 meters in front of the ego vehicle 1310, but because the lead vehicle is narrow, the ego vehicle 1310 still has a clear view of both of the lane markings 1308 beyond the lead vehicle 1320.

Figure 13C:
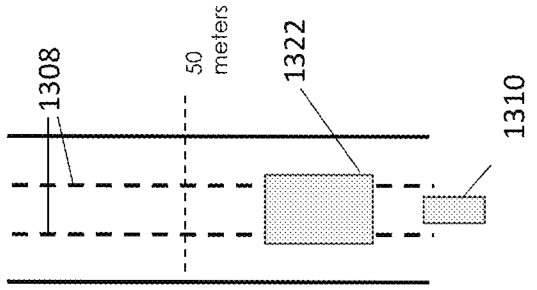

In FIG. 13C, the rear of the lead vehicle 1322 is closer than 50 meters in front of the ego vehicle 1310. In this case, because the lead vehicle 1322 is wider than the lane markings 1308, the ego vehicle 1310 does not have a clear view of both of the lane markings 1308 beyond the rear of the lead vehicle 1322.

Figure 13D:
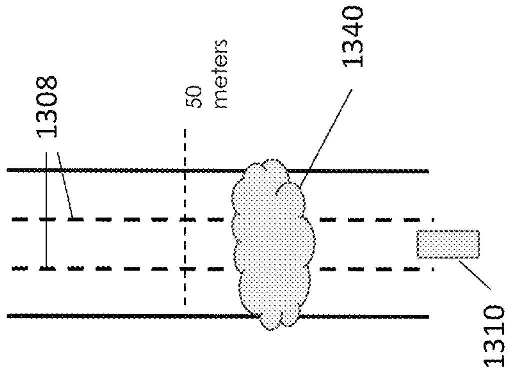

In FIG. 13D, an environmental condition 1340, obscures the lane markings in front of the ego vehicle 1310, such that the lane markings 1308 are not visible at a distance of 50 meters from the ego vehicle 1310. The ego vehicle 1310 does not have a clear view of both of the lane markers 1308 beyond the obscuring environmental condition 1340. Non-limiting examples of environmental conditions 1340 that may obscure the view ahead of the ego vehicle 1310 include fog, rain, mist, steam from underground pipes, water spray from sprinklers, road spray, and vehicle exhaust.

Figure 14A:
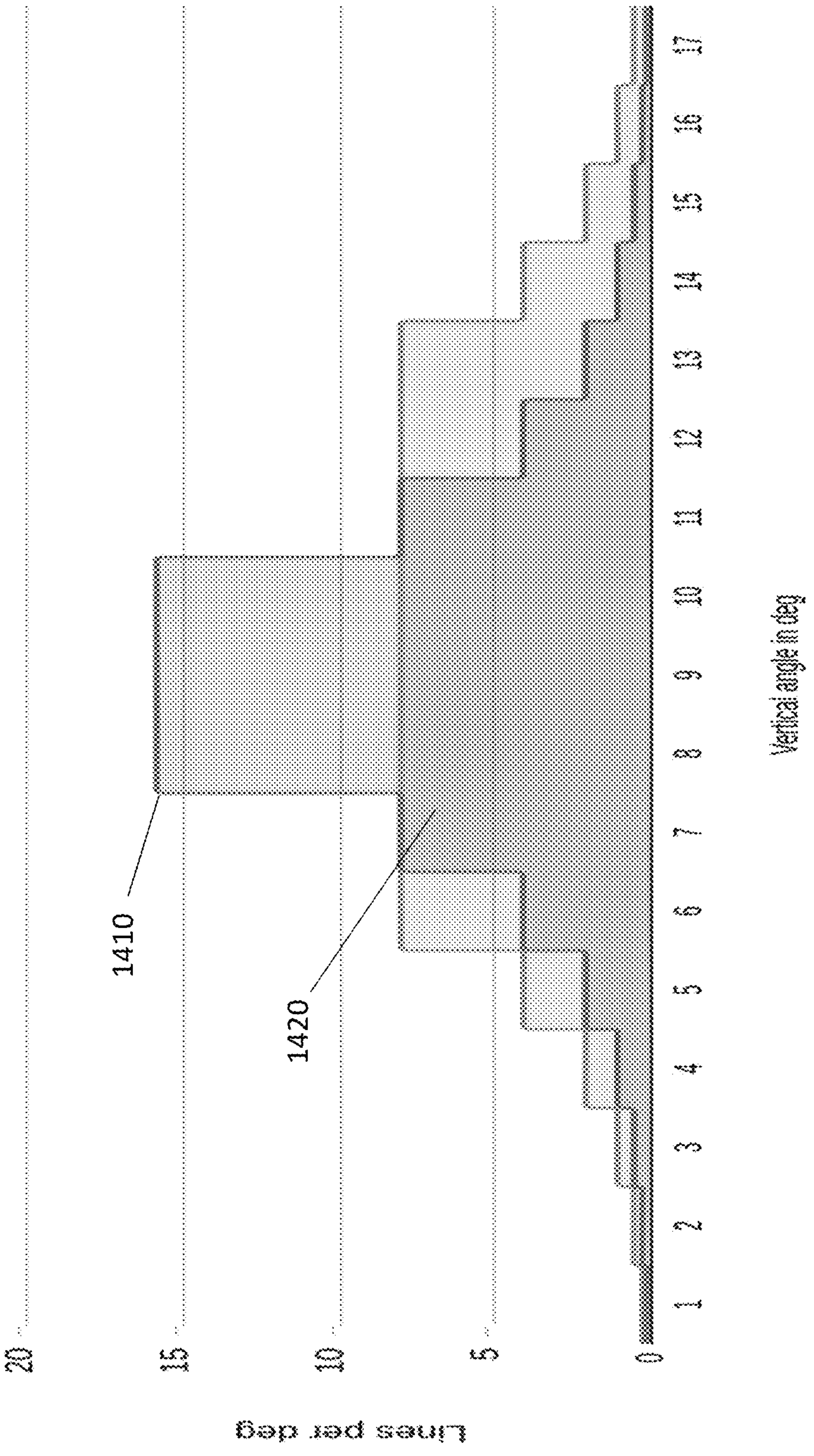
FIGS. 14A-C are graphs of example vertical scan density patterns.
Figure 14B:
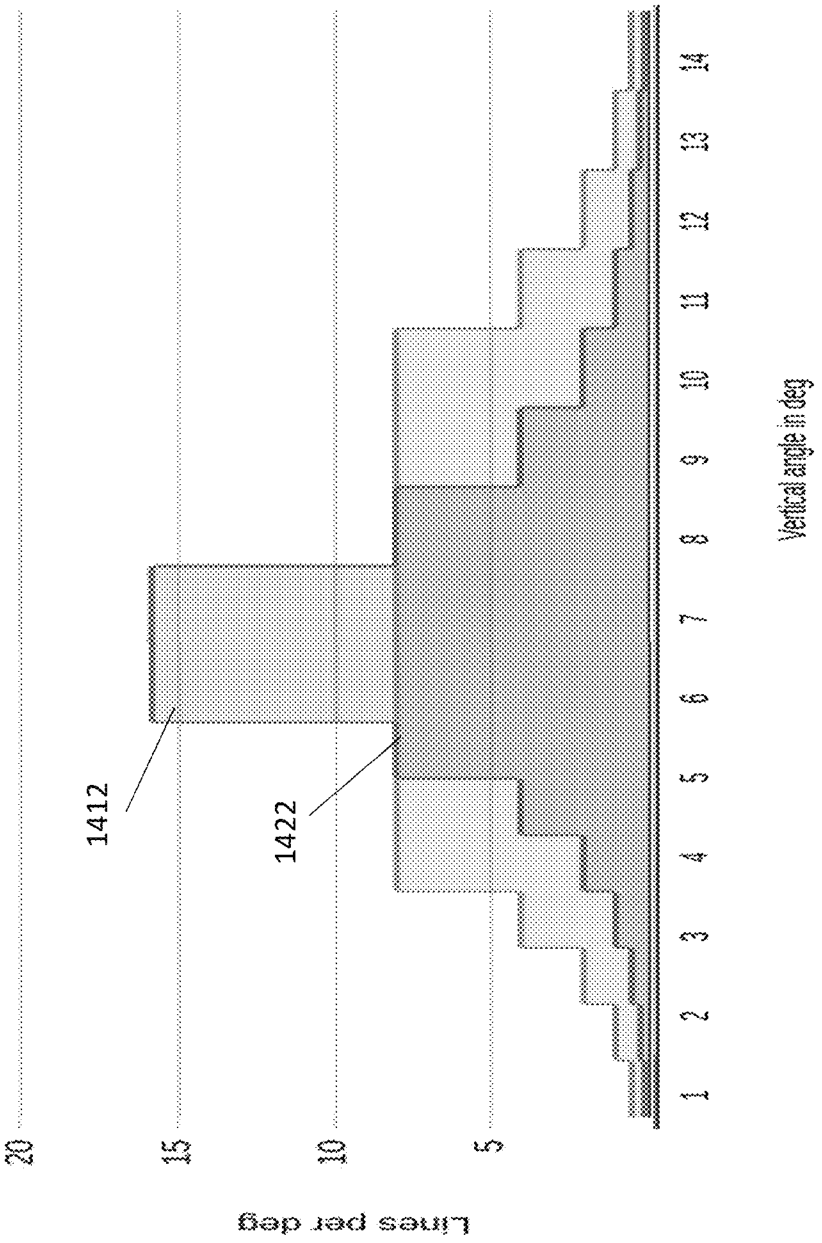
Figure 14C:
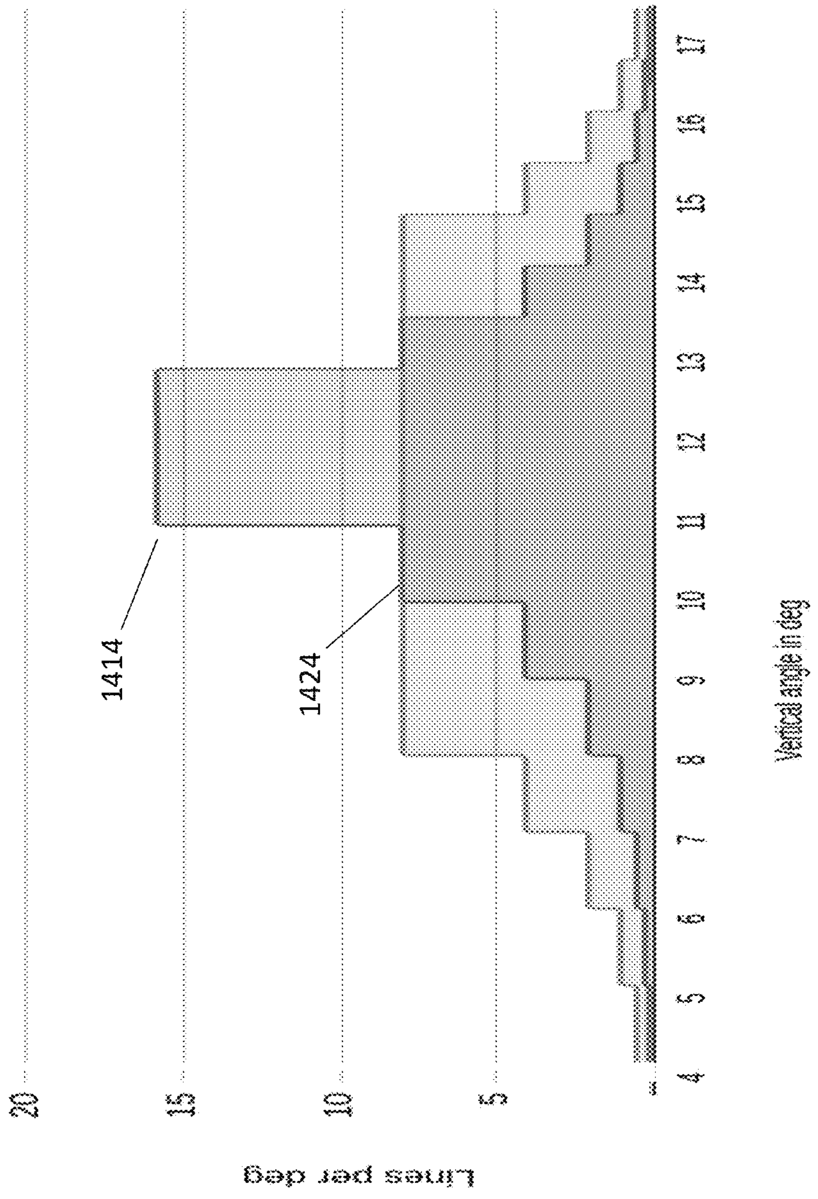

FIG. 14A illustrates two examples of vertical scan density patterns, 1410 (light grey) and 1420 (dark grey). The dark grey scan pattern 1420 is an example of a static vertical scan density pattern that can be used when a lidar system is outside the ODD. In this example, the pattern has a vertical range with peak density of 8 deg and vertical spacing at peak density: 0.12 deg. The light grey scan pattern 1410 is an example of a dynamic vertical scan pattern having a narrower peak density of 3 degrees within which the vertical scan spacing is more focused at 0.064 degrees between scan lines. The dynamic scan pattern 1410 tracks the VROI as described herein, whereas the static scan pattern 1420 is a default pattern to which a lidar system reverts when outside the ODD when conditions are such that the horizon cannot be reliably detected.

While FIG. 14A illustrates only two possibilities: a dynamic vertical scan pattern 1410 and a static vertical scan pattern 1420, in some implementations, it may be desirable to have multiple thresholds wherein the vertical scan density of a fixed or static pattern varies depending on the clear visible distance in front of the vehicle.

In some implementations, when the vehicle is going slow (e.g., in traffic or an urban environment), it may be desirable to focus a shorter distance ahead of the vehicle. In this case, the region of the scan pattern with the higher scan-line density is moved to a lower angle within the field of regard to see greater detail at shorter distances. Thus, in the example vertical density scan patterns of FIG. 14B, 1412 and 1422 the central plateaus and corresponding right and left shoulders are shifted to the left (i.e. the peak density is at lower angles than in FIG. 14A) when the vehicle is travelling at a slow speed. In some implementations, the magnitude of the leftward shift can vary based on speed.

When the vehicle is going fast (e.g., on the highway), it may be desirable to focus a longer distance ahead of the vehicle (e.g., so there is more time to identify and react to objects ahead). In this case the higher-density region of the scan pattern is moved to a higher angle to see farther ahead. Thus, in the example vertical density scan patterns of FIG. 14C, 1414 and 1424 the central plateaus and corresponding right and left shoulders are shifted to the right (i.e. the peak density is at higher angles than in FIG. 14A) when the vehicle is travelling at a high speed. In some implementations, the magnitude of the rightward shift can vary based on speed.

Figure 15A:
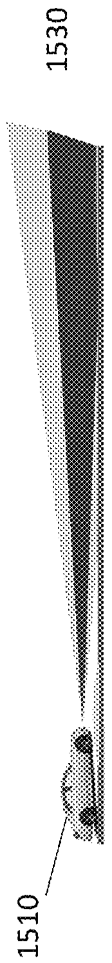
FIGS. 15A-B illustrate vertical scan density patterns without and with an obstacle in the roadway.
Figure 15B:
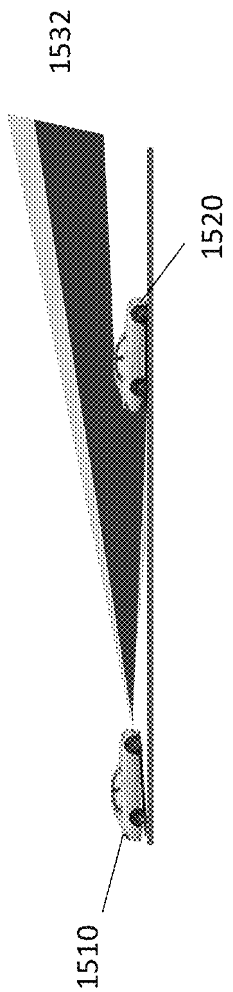

FIG. 15A illustrates a narrowly focused vertical scan density pattern 1530 when the ego vehicle 1510 has a clear view ahead, and FIG. 15B illustrates a broader vertical scan density pattern 1532 applied when there is a vehicle 1520 ahead of the ego vehicle 1510 obstructing the view.

Figure 16:
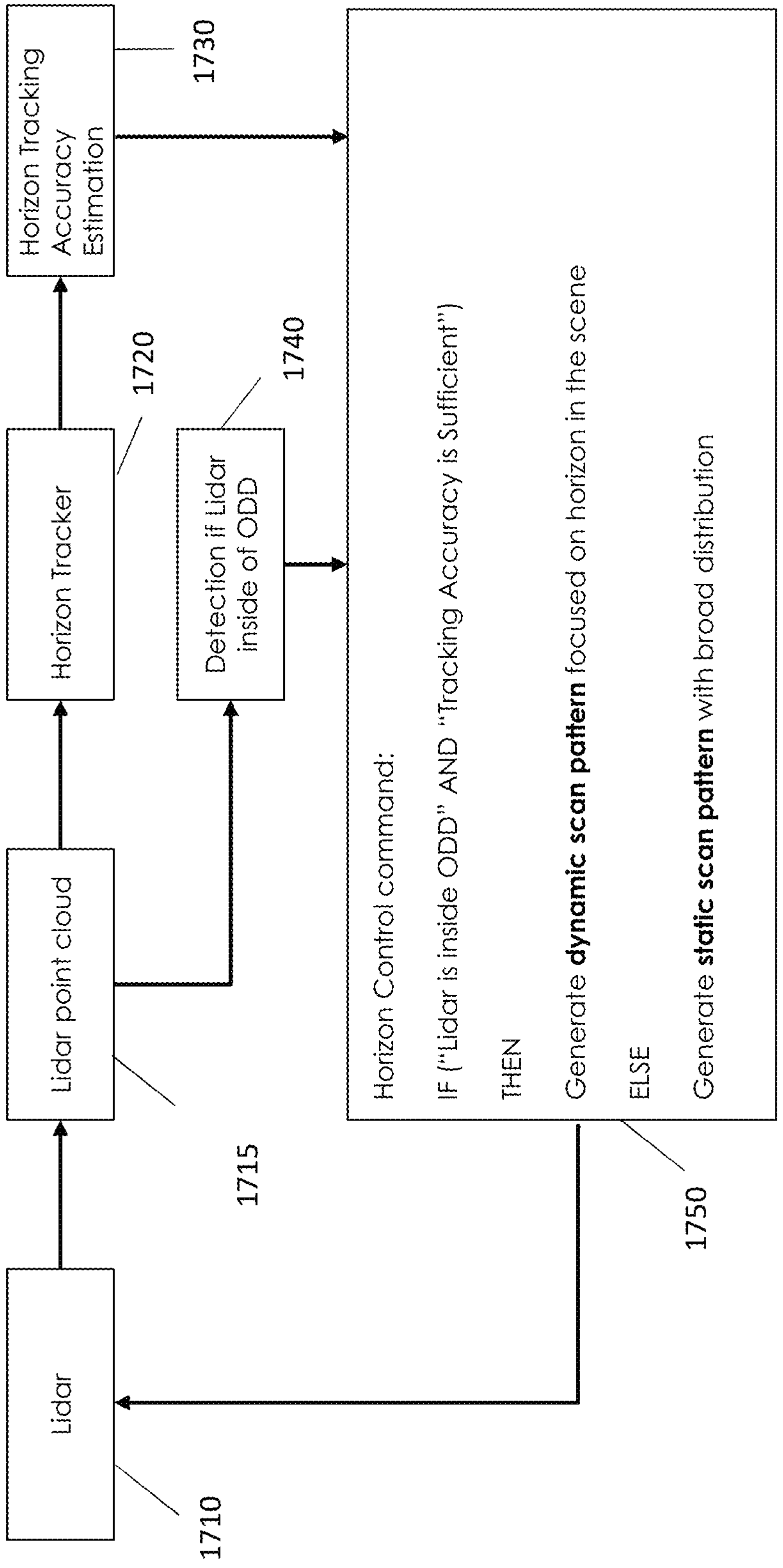
FIG. 16 is an example control flow diagram for determining usage of a dynamic or static vertical scan density pattern.
Figure 17:
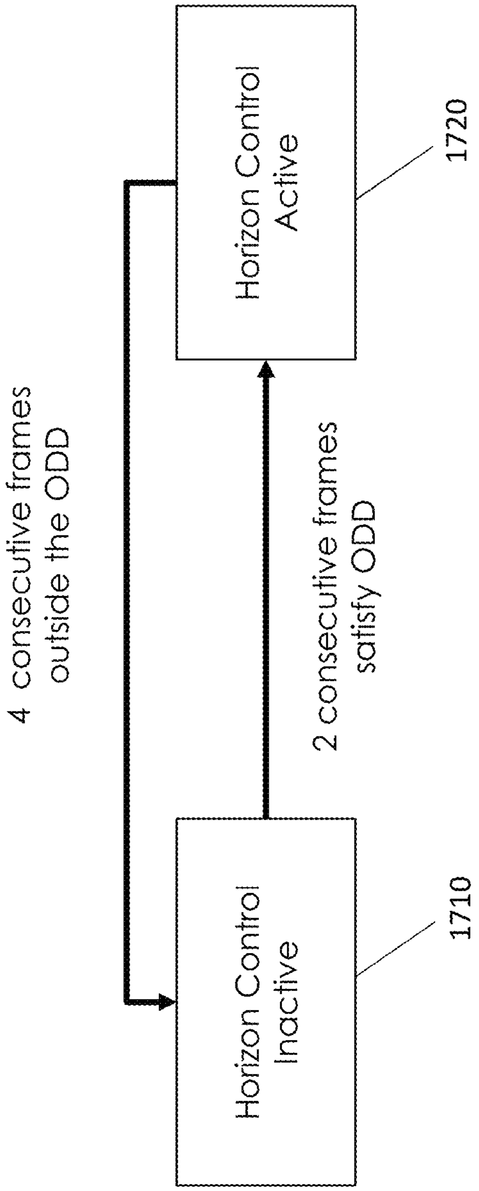
FIG. 17 is an example vertical scan density hysteresis loop.

FIG. 16 shows a conceptual block diagram for the elements necessary to implement an ODD based decision on whether to use active horizon control or a static vertical scan density pattern. A lidar system 1710 generates a lidar point cloud 1715. As new point clouds are generated the horizon tracker 1720, which is described in detail above, determines an elevation angle relative to the neutral look direction for the horizon in the current point cloud. The lidar point cloud is analyzed 1740 to determine if the scene is within the ODD, as described above. In addition, a horizon tracking accuracy estimation 1730 is made. In control block 1750, if the scene is determined to be within the ODD and the horizon tracking is above a predetermined threshold then a dynamic vertical scan pattern will be used. If either of these two criteria are not met, then a static vertical scan pattern will be used for the next frame.

In some implementations, it may be desirable to maintain different threshold conditions for entering and exiting a horizon control mode. FIG. 16 illustrates a flow diagram for an example where two consecutive lidar point cloud frames that are inside the ODD are required to enter the Horizon Control mode 1620 from the inactive mode with a static vertical scan density 1610. Conversely, four consecutive lidar point cloud frames that are outside the ODD are required to enter the inactive mode with a static vertical scan density 1610 from the Horizon Control mode 1620. In this case, there may be reasons not to lose Horizon Control as easily as it is to enter Horizon Control. There may also be implementations where the opposite set of conditions are desirable such that more lidar frames inside the ODD are required to enter Horizon Control than are required to exit Horizon Control from the inactive mode. In further implementations, the hysteresis thresholds may vary according to other conditions such as day or night driving, road surface conditions, number of lanes, weather and the like.

In some cases, a computing device may be used to implement various modules, circuits, systems, methods, or algorithm steps disclosed herein. As an example, all or part of a module, circuit, system, method, or algorithm disclosed herein may be implemented or performed by a general-purpose single- or multi-chip processor, a digital signal processor (DSP), an ASIC, a FPGA, any other suitable programmable-logic device, discrete gate or transistor logic, discrete hardware components, or any suitable combination thereof. A general-purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In particular embodiments, one or more implementations of the subject matter described herein may be implemented as one or more computer programs (e.g., one or more modules of computer-program instructions encoded or stored on a computer-readable non-transitory storage medium). As an example, the steps of a method or algorithm disclosed herein may be implemented in a processor-executable software module which may reside on a computer-readable non-transitory storage medium. In particular embodiments, a computer-readable non-transitory storage medium may include any suitable storage medium that may be used to store or transfer computer software and that may be accessed by a computer system. Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs (e.g., compact discs (CDs), CD-ROM, digital versatile discs (DVDs), blue-ray discs, or laser discs), optical disc drives (ODDs), magneto-optical discs, magneto-optical drives, floppy diskettes, floppy disk drives (FDDs), magnetic tapes, flash memories, solid-state drives (SSDs), RAM, RAM-drives, ROM, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In some cases, certain features described herein in the context of separate implementations may also be combined and implemented in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

While operations may be depicted in the drawings as occurring in a particular order, this should not be understood as requiring that such operations be performed in the particular order shown or in sequential order, or that all operations be performed. Further, the drawings may schematically depict one more example processes or methods in the form of a flow diagram or a sequence diagram. However, other operations that are not depicted may be incorporated in the example processes or methods that are schematically illustrated. For example, one or more additional operations may be performed before, after, simultaneously with, or between any of the illustrated operations. Moreover, one or more operations depicted in a diagram may be repeated, where appropriate. Additionally, operations depicted in a diagram may be performed in any suitable order. Furthermore, although particular components, devices, or systems are described herein as carrying out particular operations, any suitable combination of any suitable components, devices, or systems may be used to carry out any suitable operation or combination of operations. In certain circumstances, multitasking or parallel processing operations may be performed. Moreover, the separation of various system components in the implementations described herein should not be understood as requiring such separation in all implementations, and it should be understood that the described program components and systems may be integrated together in a single software product or packaged into multiple software products.

Various implementations have been described in connection with the accompanying drawings. However, it should be understood that the figures may not necessarily be drawn to scale. As an example, distances or angles depicted in the figures are illustrative and may not necessarily bear an exact relationship to actual dimensions or layout of the devices illustrated.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

The term "or" as used herein is to be interpreted as an inclusive or meaning any one or any combination, unless expressly indicated otherwise or indicated otherwise by context. Therefore, herein, the expression "A or B" means "A, B, or both A and B." As another example, herein, "A, B or C" means at least one of the following: A; B; C; A and B; A and C; B and C; A, B and C. An exception to this definition will occur if a combination of elements, devices, steps, or operations is in some way inherently mutually exclusive.

As used herein, words of approximation such as, without limitation, "approximately, "substantially," or "about" refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as having the required characteristics or capabilities of the unmodified feature. In general, but subject to the preceding discussion, a numerical value herein that is modified by a word of approximation such as "approximately" may vary from the stated value by ±0.5%, ±1%, ±2%, ±3%, ±4%, ±5%, ±10%, ±12%, or ±15%.

As used herein, the terms "first," "second," "third," etc. may be used as labels for nouns that they precede, and these terms may not necessarily imply a particular ordering (e.g., a particular spatial, temporal, or logical ordering). As an example, a system may be described as determining a "first result" and a "second result," and the terms "first" and "second" may not necessarily imply that the first result is determined before the second result.

As used herein, the terms "based on" and "based at least in part on" may be used to describe or present one or more factors that affect a determination, and these terms may not exclude additional factors that may affect a determination. A determination may be based solely on those factors which are presented or may be based at least in part on those factors. The phrase "determine A based on B" indicates that B is a factor that affects the determination of A. In some instances, other factors may also contribute to the determination of A. In other instances, A may be determined based solely on B.

The invention claimed is:

1. A method for controlling an image sensor of a vehicle comprising:

establishing a first image density pattern for a field of regard of the image sensor;

establishing a second image density pattern for the field of regard for the image sensor; and determining whether to scan with the first image density pattern or the second image density pattern based on an analysis of an image returned by the image sensor, wherein the analysis includes determining, based on the image, a lower bound and an upper bound of a vertical region of interest (VROI) within the field of regard, computing a virtual horizon based on the lower bound and the upper bound such that the virtual horizon is between the lower bound and the upper bound, computing a confidence metric for the virtual horizon based on a difference between the lower bound and the upper bound, and selecting the first image density pattern or the second image density pattern based on whether the confidence metric satisfies a predetermined threshold.

2. The method of claim 1, wherein:

the first image density pattern includes first horizontal scan lines having a distribution along a vertical axis that is dynamically adjusted based on a location of the virtual horizon; and the second image density pattern includes second horizontal scan lines having a fixed distribution along the vertical axis, wherein, about a vertical angle corresponding to the virtual horizon, a density of the first horizontal scan lines is greater than a density of the second horizontal scan lines.

3. The method of claim 2, further comprising, in response to a movement of the virtual horizon to a new location along the vertical axis, adjusting the distribution of the first horizontal scan lines along the vertical axis so that a peak density of the first horizontal scan lines coincides with the new location of the virtual horizon.

4. The method of claim 3, wherein the peak density of the first horizontal scan lines increases as a distance from the vehicle to the virtual horizon increases.

5. The method of claim 1, wherein the first image density pattern includes first horizontal scan lines having a distribution along a vertical axis that is dynamically adjusted based on a speed of the vehicle.

6. The method of claim 1, wherein the analysis is based in part on a first observable distance to a first obstruction or a second observable distance to a road marking associated with a lane of travel of the vehicle.

7. The method of claim 6, wherein the first obstruction is at least partially in a lane of travel of the vehicle.

8. The method of claim 7, further comprising: scanning with the first image density pattern on a condition that a) the first observable distance to the first obstruction is greater than a predetermined obstruction threshold and a horizon tracking estimation is valid or b) the second observable distance to the road marking associated with a lane of travel of the vehicle is greater than a predetermined marking threshold and the horizon tracking estimation is valid.

9. The method of claim 1, further comprising: changing from scanning with the first image density pattern to the second image density pattern or from scanning with the second image density pattern to the first image density pattern.

10. The method of claim 9, wherein changing from scanning with the first image density pattern to the second image density pattern is performed when a second vehicle obscures a portion of the field of regard.

11. The method of claim 9, wherein changing from scanning with the first image density pattern to the second image density pattern is performed when an environmental condition obscures a portion of the field of regard.

12. The method of claim 9, wherein the changing from scanning with the first image density pattern to the second image density pattern requires a first threshold condition to be met and the changing from the second image density pattern to the first image density pattern requires a second threshold condition to be met.

13. The method of claim 12, wherein the first threshold is acquisition of a first predetermined number of lidar frames with a portion of the field of regard partially obscured and the second threshold is acquisition of a second predetermined number of lidar frames wherein the field of regard is not obscured.

14. The method of claim 1, wherein:

the image sensor is a lidar system configured to obtain a plurality of horizontal scans of the field of regard; and the first image density pattern has a greater concentration of horizontal scans about a first vertical angle relative to the virtual horizon than the second image density pattern.

15. The method of claim 14, further comprising dynamically adjusting the first image density pattern based on a determination of an elevation angle of the virtual horizon in the field of regard.

16. An imaging system implemented in a vehicle, the imaging system comprising:

an imaging sensor configured to generate sensor data as the vehicle moves through an environment; and a controller configured to:

receive the sensor data from the imaging sensor;

establish a first image density pattern for a field of regard of the image sensor;

establish a second image density pattern for the field of regard for the image sensor; and determine whether to scan with the first image density pattern or the second image density pattern based on an analysis of an image returned by the image sensor, wherein the analysis includes determining, based on the image, a lower bound and an upper bound of a vertical region of interest (VROI) within the field of regard, computing a virtual horizon based on the lower bound and the upper bound such that the virtual horizon is between the lower bound and the upper bound, computing a confidence metric for the virtual horizon based on a difference between the lower bound and the upper bound, and selecting the first image density pattern or the second image density pattern based on whether the confidence metric satisfies a predetermined threshold.

17. The imaging system of claim 16, wherein:

the first image density pattern includes first horizontal scan lines having a distribution along a vertical axis that is dynamically adjusted based on a location of the virtual horizon; and the second image density pattern includes second horizontal scan lines having a fixed distribution along the vertical axis, wherein, about a vertical angle corresponding to the virtual horizon, a density of the first horizontal scan lines is greater than a density of the second horizontal scan lines.

18. The imaging system of claim 16, wherein the analysis is based in part on a first observable distance to a first obstruction or a second observable distance to a road marking associated with a lane of travel of the vehicle.

19. The imaging system of claim 18, wherein the first obstruction is at least partially in a lane of travel of the vehicle.

20. The imaging system of claim 19, wherein the imaging sensor is further configured to:

scan with the first image density pattern on a condition that a) the first observable distance to the first obstruction is greater than a predetermined obstruction threshold and a horizon tracking estimation is valid or b) the second observable distance to the road marking associated with a lane of travel of the vehicle is greater than a predetermined marking threshold and the horizon tracking estimation is valid.

* * * * *